(12) United States Patent  
Ishihara et al.

(10) Patent No.: US 9,255,385 B2  
(45) Date of Patent: Feb. 9, 2016

(54) HYBRID CONSTRUCTION MACHINE

(71) Applicant: Hitachi Construction Machinery Co., Ltd., Bunkyo-ku, Tokyo (JP)

(72) Inventors: Shinji Ishihara, Tokyo (JP); Masatoshi Hoshino, Tokyo (JP); Shinya Sato, Tokyo (JP); Kouji Ishikawa, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/626,201

(22) Filed: Feb. 19, 2015

(65) Prior Publication Data

US 2015/0275484 A1    Oct. 1, 2015

(30) Foreign Application Priority Data

Mar. 31, 2014  (JP) .................. 2014-072886

(51) Int. Cl.  
    *G06F 7/70* (2006.01)  
    *E02F 9/20* (2006.01)  
    *E02F 9/22* (2006.01)  
    *B60W 20/00* (2006.01)  
    *F02D 29/00* (2006.01)

(52) U.S. Cl.  
    CPC .............. *E02F 9/2075* (2013.01); *B60W 20/00* (2013.01); *E02F 9/2091* (2013.01); *E02F 9/2246* (2013.01); *E02F 9/2296* (2013.01); *F02D 29/00* (2013.01); *Y10S 903/93* (2013.01)

(58) Field of Classification Search  
    CPC ......... E02F 9/20; E02F 9/2075; E02F 6/2292; F02D 31/00; F02D 41/0205; F02D 41/021; H02P 9/04; B60W 10/08; B60W 10/06; B60K 6/485  
See application file for complete search history.

(56) References Cited

U.S. PATENT DOCUMENTS

| | | | |
|---|---|---|---|
| 9,004,206 B2* | 4/2015 | Kawaguchi | F02D 41/021 180/65.265 |
| 2014/0054902 A1* | 2/2014 | Kawaguchi | F02D 41/021 290/40 B |
| 2014/0188373 A1* | 7/2014 | Kawaguchi | E02F 9/2075 701/110 |
| 2015/0315766 A1* | 11/2015 | Take | F02D 41/0205 701/22 |

FOREIGN PATENT DOCUMENTS

JP    2003-28071 A    1/2003

\* cited by examiner

*Primary Examiner* — Behrang Badii  
(74) *Attorney, Agent, or Firm* — Crowell & Moring LLP

(57) ABSTRACT

A hybrid construction machine according to the present invention includes a controller for controlling an engine with a droop characteristic. The controller includes: a target engine output calculation unit (2-4) that calculates a target output of the engine; a target speed setting unit (2-7) that sets a target speed command of a motor-generator; a target droop calculation unit (2-8) that obtains an intersection point of a constant output line with the target output value of the engine and a constant speed line with the target speed command of the motor-generator on a speed-torque characteristic diagram, and determines a governor characteristic of the engine so that the governor characteristic passes through the intersection point; a governor characteristic changing unit (2-10) that changes the governor characteristic of the engine; and a motor-generator control unit (2-9) that controls the motor-generator in accordance with the target speed command value.

8 Claims, 19 Drawing Sheets

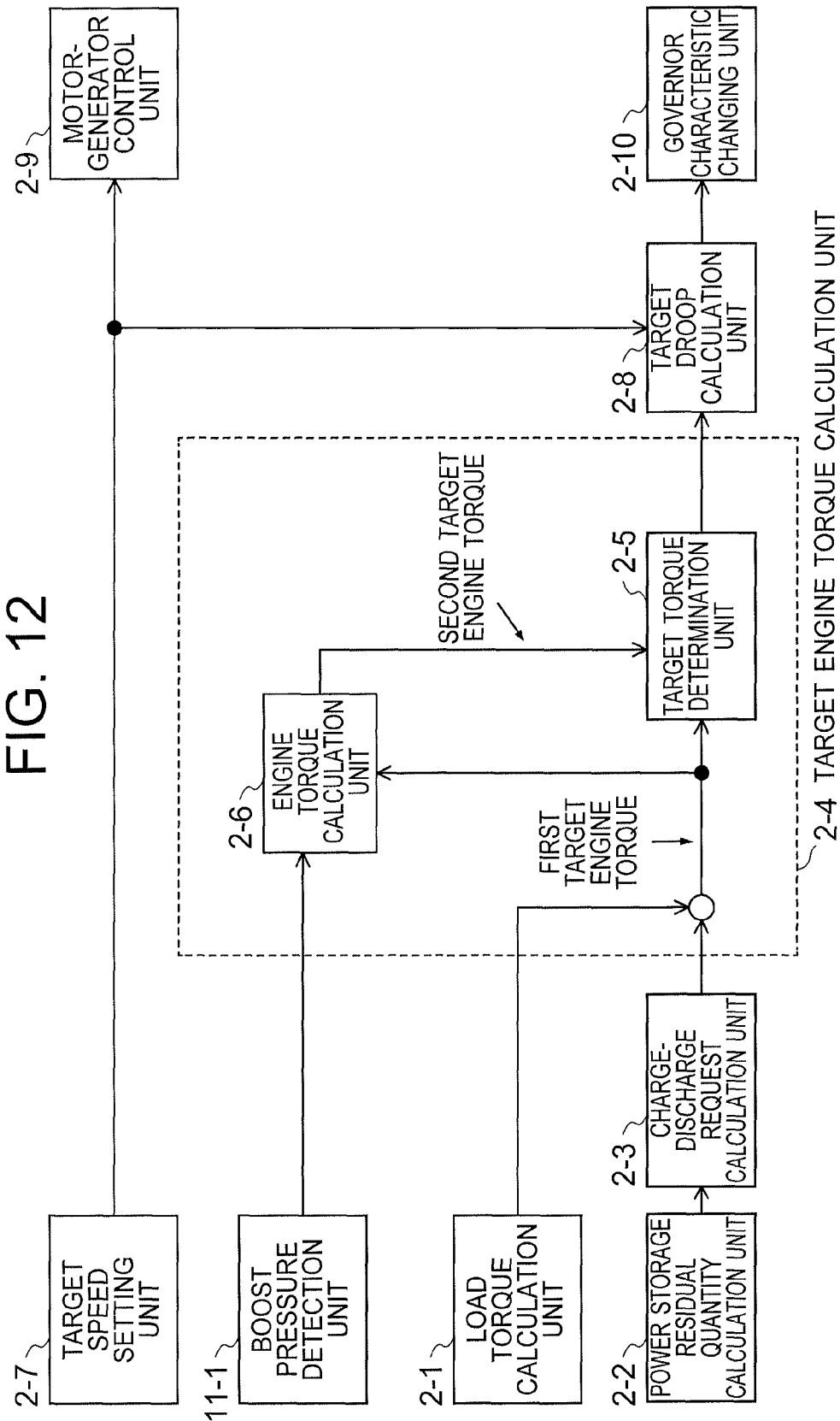

HYBRID CONSTRUCTION MACHINE

BACKGROUND

1. Field of the Invention

The present invention relates to a hybrid construction machine which includes an engine, and a motor-generator that is mechanically coupled to the engine to assist the power of the engine.

2. Description of the Related Art

Construction machines are typically equipped with a turbocharged engine including a turbo supercharger. In the related art construction machine including the turbocharged engine, when abrupt load fluctuation by a hydraulic pump occurs, a phenomenon called lug-down occurs, in which the engine speed is temporarily reduced. When lug-down occurs, a governor increases fuel injection quantity and attempts to return an actual speed to a target speed in order to cope with the reduction in engine speed, and such abrupt fuel injection can lead to black smoke generation or fuel deterioration.

The above phenomenon occurs when the abruptly-increased hydraulic pressure load exceeds engine output as a result of the delay of rising of engine output resulting from that it takes time for the boost pressure to rise in the turbocharged engine. Under such circumstances, operation of the construction machine slows down due to an insufficient supply of power to the hydraulic pump, which can cause operator discomfort.

It should be noted that the turbocharger is commonly known as the occurrence of a time lag until it becomes sufficiently functional after the start of supercharging, and such delay in response is referred to as turbo lag. The occurrence of turbo lag is due to the mechanism itself of the turbocharger, and therefore is difficult to eliminate.

Therefore, a technology using a hybrid system which includes a motor-generator as a power source in addition to the engine for compensating for the lack of engine output is known. For example, Japanese Published Unexamined Patent Application No. 2003-28071 discloses the following technology (see Abstract). An engine speed Nr corresponding to optimum torque of a set speed N0 is calculated as a target speed in a controller 9. When load torque of the engine 1 is large and an engine speed N is lower than the target speed Nr, the motor-generator 6 is operated as a motor in accordance with a deviation ANr so as to perform torque assist. When the load torque of the engine 1 is small and the engine speed N is higher than the target speed Nr, the motor-generator 6 is operated as a generator in accordance with the deviation ANr so as to generate electric power and accumulate the electricity in a battery 7. Thus, the engine 1 is controlled to get closer to the optimum operation state.

In the related art according to the Japanese Published Unexamined Patent Application No. 2003-28071 (hereinafter simply referred to as the "related art"), the engine is controlled by a governor characteristic (hereinafter, as appropriate, referred to as "droop characteristic") having a predetermined inclination such that the engine speed decreases with increasing load. Furthermore, in the related art, the droop characteristic of the engine is fixed, and when the target torque of the engine changes, the engine speed is changed in accordance with the droop characteristic. That is, in the related art, control is performed so that the droop characteristic of the engine is fixed and the speed command of the motor is variable.

Furthermore, since the maximum engine speed at no load is determined by the droop characteristic, it is difficult to reduce the maximum engine speed in the related art, which results in a problem such as a loss due to drag of the hydraulic pump driven by the engine.

This problem will be described in detail by using FIGS. 18 to 20. FIG. 18 is a speed-torque characteristic diagram showing the relationship among a droop characteristic of the engine, a target engine speed, and a target engine torque according to the related art. As shown in FIG. 18A, in the related art, firstly, a droop characteristic line corresponding to a no-load speed D is drawn on the speed-torque characteristic diagram. Next, when target engine torque A is given, an equal torque line (horizontal line) of the target engine torque A is drawn on the speed-torque characteristic diagram. Then, as shown in FIG. 18B, the intersection of two straight lines is determined by one point of an intersection point AD. Finally, as shown in FIG. 18C, target speed NA can be uniquely determined by drawing a perpendicular line from the intersection point AD to the axis representing speed.

Next, operation of the engine when the target engine torque is changed in the related art will be described by using FIG. 19. FIG. 19 is a speed-torque characteristic diagram showing changes in target speed when the target engine torque is changed. As shown in FIG. 19, when a no-load speed D and target engine torques A, B, and C are determined, target speeds NA, NB, and NC can be uniquely determined by drawing perpendicular lines to the axis representing speed from intersection points AD, BD, and CD of respective equal torque lines corresponding to the target engine torque values and a droop characteristic line D corresponding to the no-load speed D.

FIGS. 20A and 20B are time series graphs showing the relationship between the target engine torques A, B, and C and the no-load speed D of FIG. 19. As shown in FIG. 20B, in the related art, when the droop characteristic corresponding to the no-load speed D is determined, the engine speed is changed in accordance with the droop characteristic, so that the value of the no-load speed D becomes constantly the same. Consequently, the engine speed at no load does not fall below the no-load speed D. In the related art, therefore, there are still some problems that need to be addressed, such as that a loss due to drag of the hydraulic pump, etc. occurs; that engine noise cannot be reduced; and that the flow control of the hydraulic pump is complicated because the engine speed is changed in accordance with the target torque.

SUMMARY

Accordingly, an object of the present invention is to reduce the maximum engine speed at no load in a hybrid construction machine of such type as to perform engine control with a droop characteristic.

In order to achieve the above-mentioned object, an aspect of the present invention provides a hybrid construction machine includes: an engine; a hydraulic pump that is driven by the engine; a hydraulic working portion that is driven by pressure oil discharged from the hydraulic pump; a motor-generator that performs power transfer between the engine and the motor-generator; an electric storage device that supplies electric power to the motor-generator; and a controller that controls the engine with a governor characteristic having a predetermined inclination, the inclination representing a relationship between load and speed such that engine speed decreases with increasing load. The controller includes: a target engine output calculation unit that calculates a target output of the engine; a target speed setting unit that sets a target speed command of the motor-generator; a target droop calculation unit that obtains an intersection point of a constant output line with the target output value of the engine as calculated by the target engine output calculation unit and a constant speed line with the target speed command of the motor-generator on a speed-torque characteristic diagram, and determines a governor characteristic of the engine so that the governor characteristic passes through the intersection point on the speed-torque characteristic diagram; a governor characteristic changing unit that changes the governor characteristic of the engine in accordance with the governor characteristic obtained by the target droop calculation unit; and a motor-generator control unit that controls the motor-generator in accordance with the target speed command value set by the target speed setting unit.

According to the aspect of the present invention, the maximum engine speed at no load can be reduced in a hybrid construction machine of such type as to perform engine control with a droop characteristic. As a result, the loss due to, for example, drag of the hydraulic pump can be suppressed, and fuel consumption can be reduced. It should be noted that problems, constitutions, and advantages other than described above will be disclosed in the following embodiments.

BRIEF DESCRIPTION OF THE DRAWINGS

Embodiments of the present invention will be described in detail based on the following drawings, in which:

FIG. 12 is a control block diagram of a controller of a hybrid excavator according to a second embodiment of the present invention;

DETAILED DESCRIPTION

First Embodiment

Figure 1:
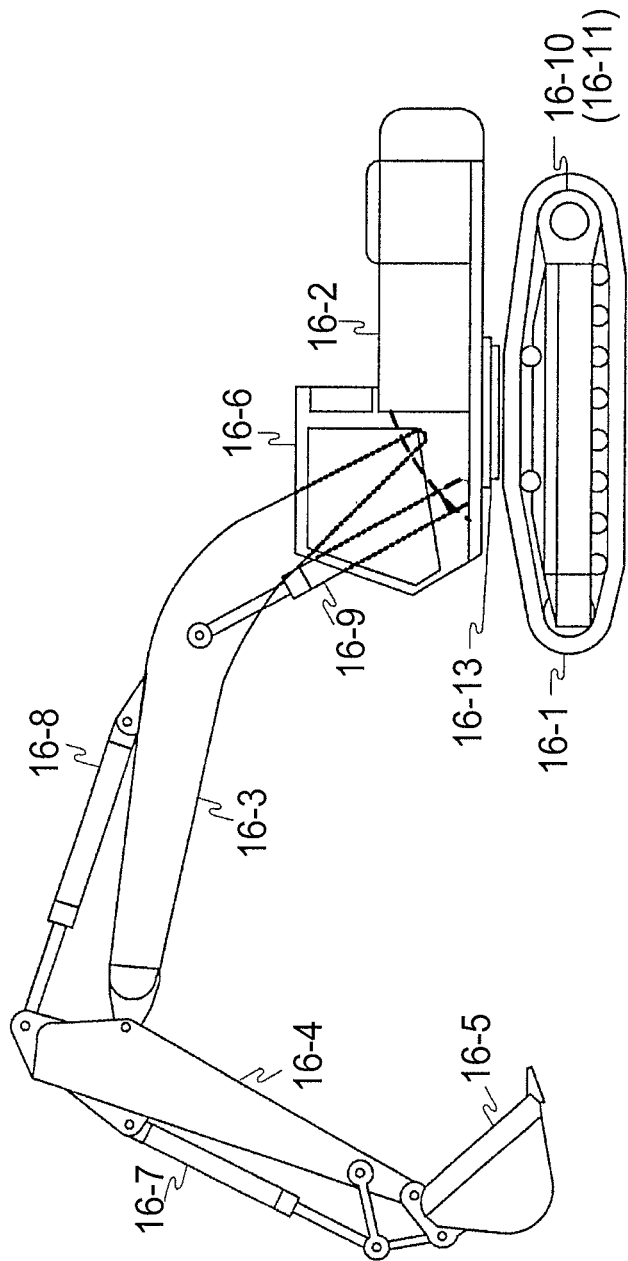
FIG. 1 is a side view of a hybrid excavator according to a first embodiment of the present invention.

Embodiments of the present invention will be described with reference to the accompanying drawings. FIG. 1 is a side view showing a general construction of a hybrid excavator according to one embodiment of the present invention. As shown in FIG. 1, the hybrid excavator (hybrid construction machine) according to the first embodiment of the present invention has an undercarriage 16-1 and a revolving superstructure 16-2. The undercarriage 16-1 includes the function of allowing the hybrid excavator to travel with left and right hydraulic motors 16-10 and 16-11. It should be noted that the traveling hydraulic motor 16-11 (not shown) is mounted on the right side of a vehicle body.

The revolving superstructure 16-2 rotates with respect to the undercarriage 16-1 with a revolving mechanism 16-13 and includes, on the other side at the front (for example, on the right side as viewed toward the front), a boom 16-3, an arm 16-4, and a bucket 16-5 for performing excavation work. The boom 16-3, the arm 16-4, and the bucket 16-5 constitute a front working machine. The boom 16-3, the arm 16-4, and the bucket 16-5 are driven by hydraulic cylinders 16-9, 16-8, and 16-7, respectively. Also, the revolving superstructure 16-2 includes a cab 16-6, in which an operator sits to operate the hybrid excavator.

Figure 2:
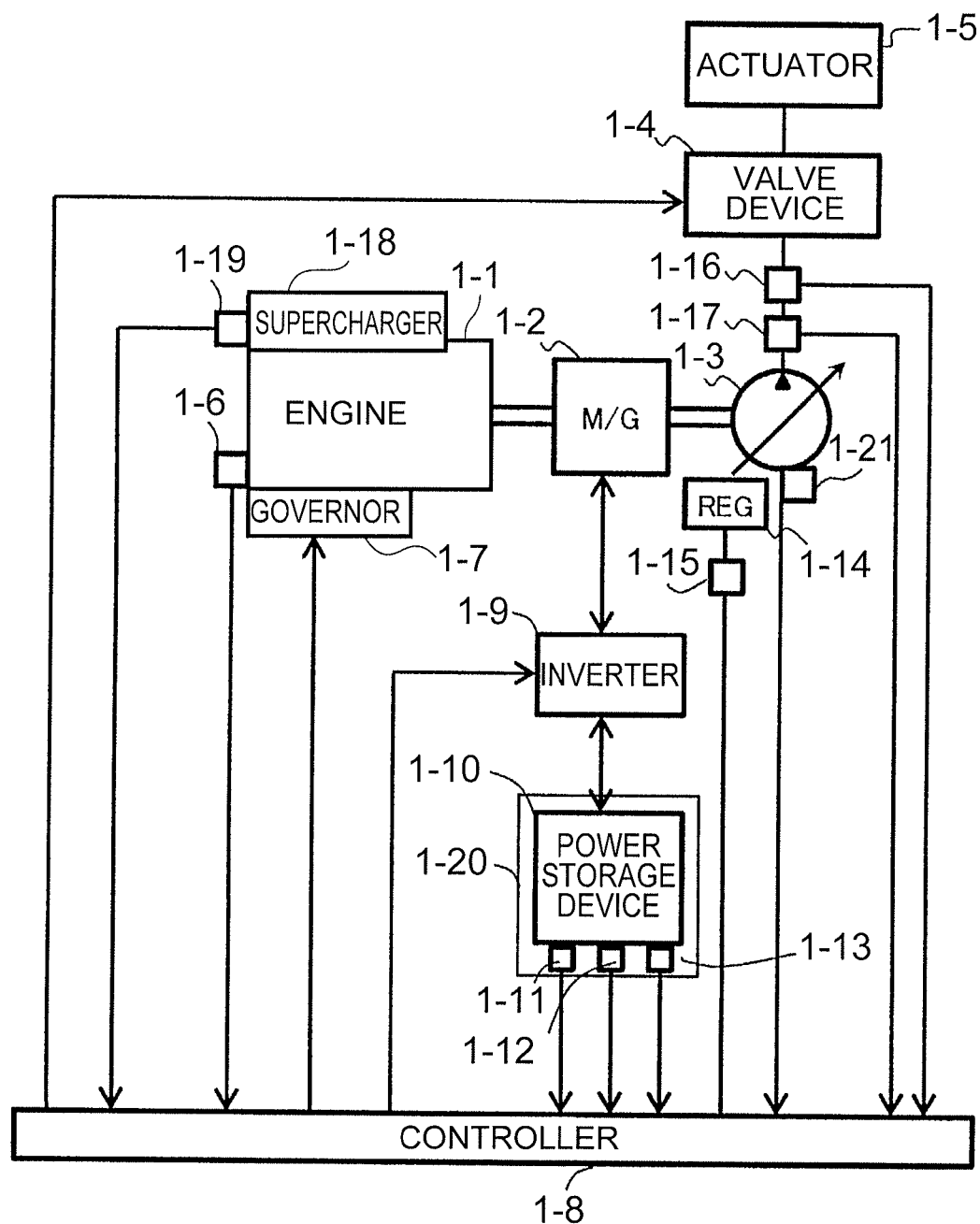
FIG. 2 shows a hydraulic drive device of the hybrid excavator shown in FIG. 1.

Next, a hydraulic drive device of the hybrid excavator according to this embodiment will be described. FIG. 2 shows a general configuration of the hydraulic drive device of the hybrid excavator according to this embodiment. As shown in FIG. 2, the hydraulic drive device used in this embodiment is used for driving the front working machine (16-3, 4, 5) serving as a hydraulic working portion of the hybrid excavator, the revolving superstructure 16-2, and the undercarriage 16-1. The hydraulic drive device includes: an engine 1-1; an engine speed sensor 1-6 for detecting engine speed; a governor 1-7 for adjusting the fuel injection quantity of the engine 1-1; a variable displacement hydraulic pump 1-3 (hereinafter simply referred to as the "hydraulic pump") driven by the engine 1-1; a motor-generator 1-2 disposed on an engine drive shaft; an electric storage device 1-20; an inverter 1-9 as a motor-generator control unit 2-9 (see FIG. 3) for controlling the motor-generator 1-2 and, as necessary, transferring electric power between the electric storage device 1-20 and the motor-generator 1-2; and a controller 1-8 for controlling the governor 1-7 to adjust the fuel injection quantity and control the engine speed, and controlling the motor-generator 1-2 through the inverter 1-9.

The engine 1-1 includes a turbo supercharger 1-18. A boost pressure sensor 1-19 for measuring boost pressure is mounted to the turbo supercharger 1-18.

Pressure oil discharged from the hydraulic pump 1-3 is supplied to a hydraulic actuator 1-5 (including the hydraulic cylinders 16-7, 8, 9) through a valve device 1-4. Various hydraulic working portions of the hybrid excavator are driven by the hydraulic actuator 1-5. Furthermore, the hydraulic pump 1-3 includes various sensors such as a discharge pressure sensor 1-16 for measuring a pressure of the discharged pressure oil, a flow sensor 1-17 for measuring a flow rate, and a tilt angle sensor 1-21 for measuring a pump tilt. The controller 1-8 can calculate a pump load on the basis of values from these sensors. This constitution can be used for a "load calculation unit" in the present invention.

A regulator 1-14 and an electromagnetic proportional valve 1-15 are designed to adjust the volume (displacement volume) of the hydraulic pump 1-3. The regulator 1-14 controls the absorption power of the hydraulic pump 1-3 by operating the tilt angle of a swash plate of the hydraulic pump 1-3. The electromagnetic proportional valve 1-15 controls the amount of operation of the regulator 1-14 in response to a drive signal calculated by the controller 1-8.

The electric storage device 1-20 includes: a capacitor 1-10 composed of a battery and a capacitor; and sensors attached to the capacitor 1-10, such as a current sensor 1-11, a voltage sensor 1-12, and a temperature sensor 1-13. The controller 1-8 performs storage quantity control on the basis of information, such as a current, a voltage, a temperature, detected by these sensors. The above constitution is used for a "power storage residual quantity calculation unit" and a "charge-discharge request calculation unit" in the present invention.

The engine 1-1 according to this embodiment is controlled by a governor characteristic (that is, a droop characteristic) having a predetermined inclination such that engine speed decreases with increasing load torque. Furthermore, the motor-generator 1-2 according to this embodiment is controlled in accordance with a target speed command.

Here, a description will be made in terms of the fact that the speed and torque of the engine 1-1 can be freely controlled by combining the engine 1-1 controlled by the droop characteristic and the motor-generator 1-2 controlled in accordance with the target speed command.

Figure 17A:
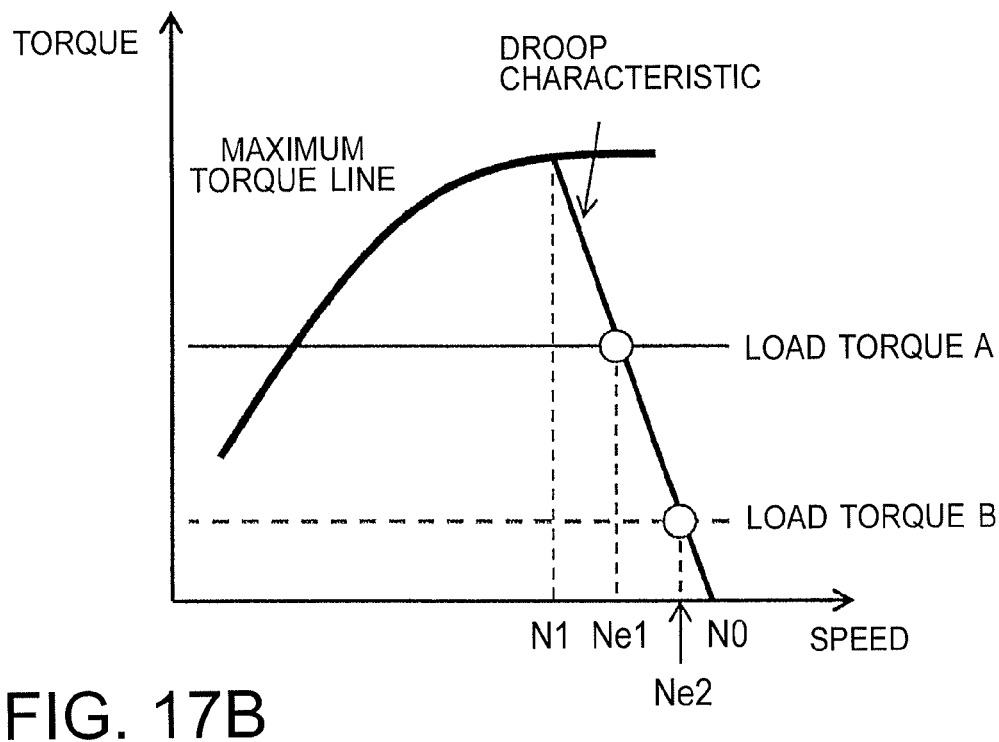
FIG. 17A is a speed-torque characteristic diagram for illustrating the operation of the engine, as a single body, having a droop characteristic.

Firstly, operation of the engine, as a single body, having a droop characteristic will be described with reference to FIG. 17A. In FIG. 17A, it is assumed that the droop characteristic is given at speed N0 under no-load conditions and at speed N1 under the maximum power conditions. Since the torque of the engine 1-1 having the droop characteristic is determined on this straight line, the engine speed decreases with increasing load torque. For example, speed control is performed such that when the load on the engine 1-1 is a load torque A, the engine speed becomes Ne1, and when the load on the engine 1-1 is a load torque B, the engine speed becomes Ne2.

Next, operation of the engine 1-1 controlled by the droop characteristic in combination with the motor-generator 1-2 that is controlled in accordance with the target speed command will be described with reference to FIG. 17B. When target speed N* is given to the motor-generator 1-2, the engine 1-1 mechanically connected to the motor-generator 1-2 operates at the same speed N* as the motor-generator 1-2. Then the engine 1-1 outputs a torque T* corresponding to the speed N* in accordance with the droop characteristic. At this time, the difference in torque between the actual load torque and the engine torque is automatically eliminated by the speed control of the motor-generator 1-2.

Figure 17B:
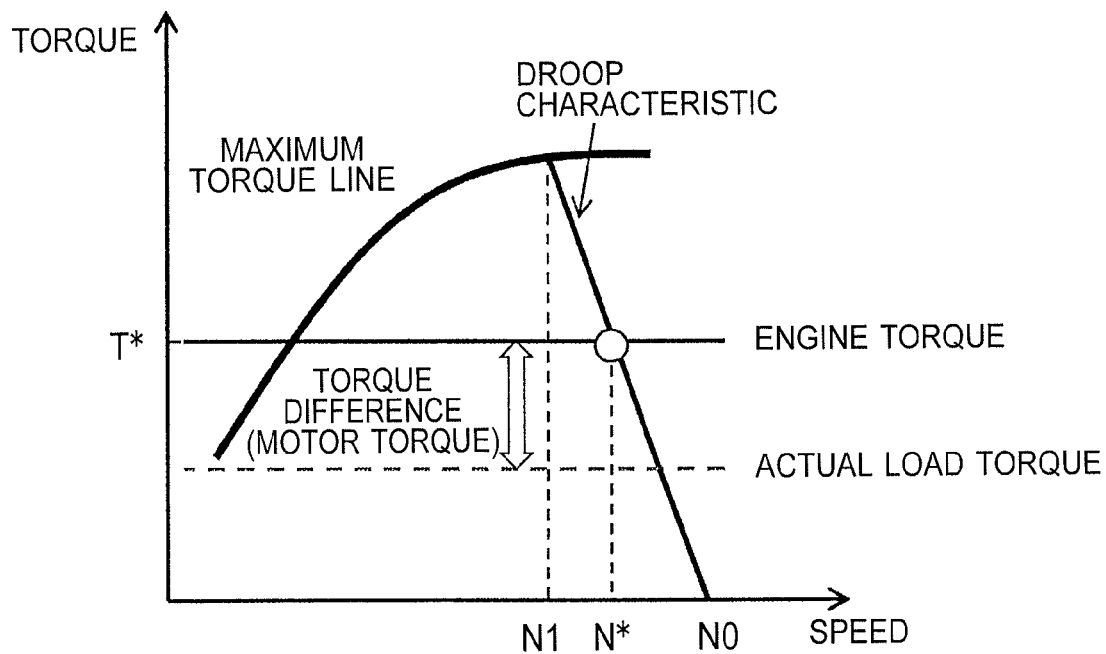
FIG. 17B is a speed-torque characteristic diagram for illustrating the operation of the engine in case where the engine having the droop characteristic is combined with a motor-generator controlled in accordance with a target speed command.
Figure 18A:
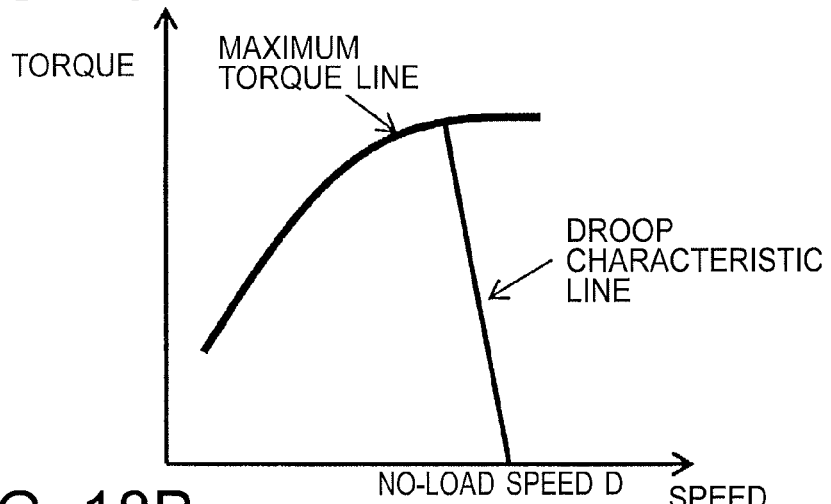
FIGS. 18A to 18C are speed-torque characteristic diagrams showing the relationship among an engine droop characteristic, a target engine speed, and a target engine torque according to the related art.
Figure 18B:
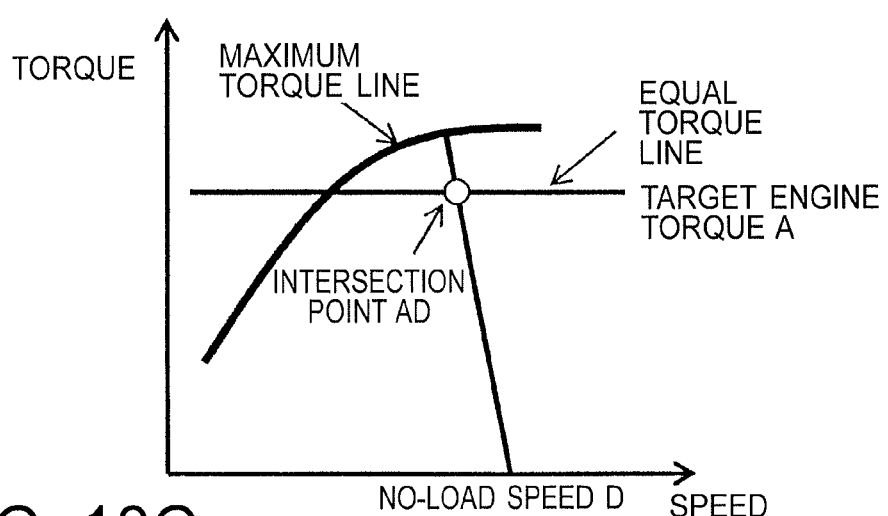
Figure 18C:
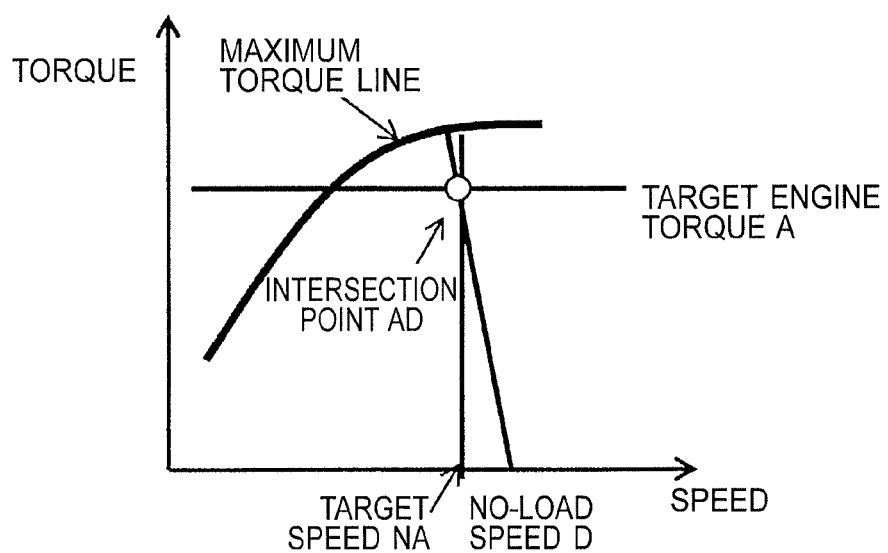

Furthermore, even when the load torque of the hydraulic pump 1-3 changes abruptly from the conditions shown in FIG. 17B, the motor-generator 1-2 immediately eliminates a slight speed deviation caused by a change in load because its output response is faster than the engine 1-1. Therefore, the engine torque is kept fixed to the torque T*.

Thus, even if the oil pressure load increases abruptly, the total load torque of the engine 1-1 and the motor-generator 1-2 can be readily ensured, and therefore lug-down can be avoided. Further, even if load torques of the hydraulic pump 1-3, engine auxiliary machines, etc. cannot be precisely detected, engine power can be continuously fixed to the torque T* by providing the target speed N* command to the motor-generator 1-2, so that the torque of the engine 1-1 can be robustly controlled.

As can be seen from the above, the constitution of this embodiment allows the engine 1-1 to operate with the optional engine torque T* in place of the actual engine torque by controlling the target speed N* of the motor-generator 1-2.

Figure 3:
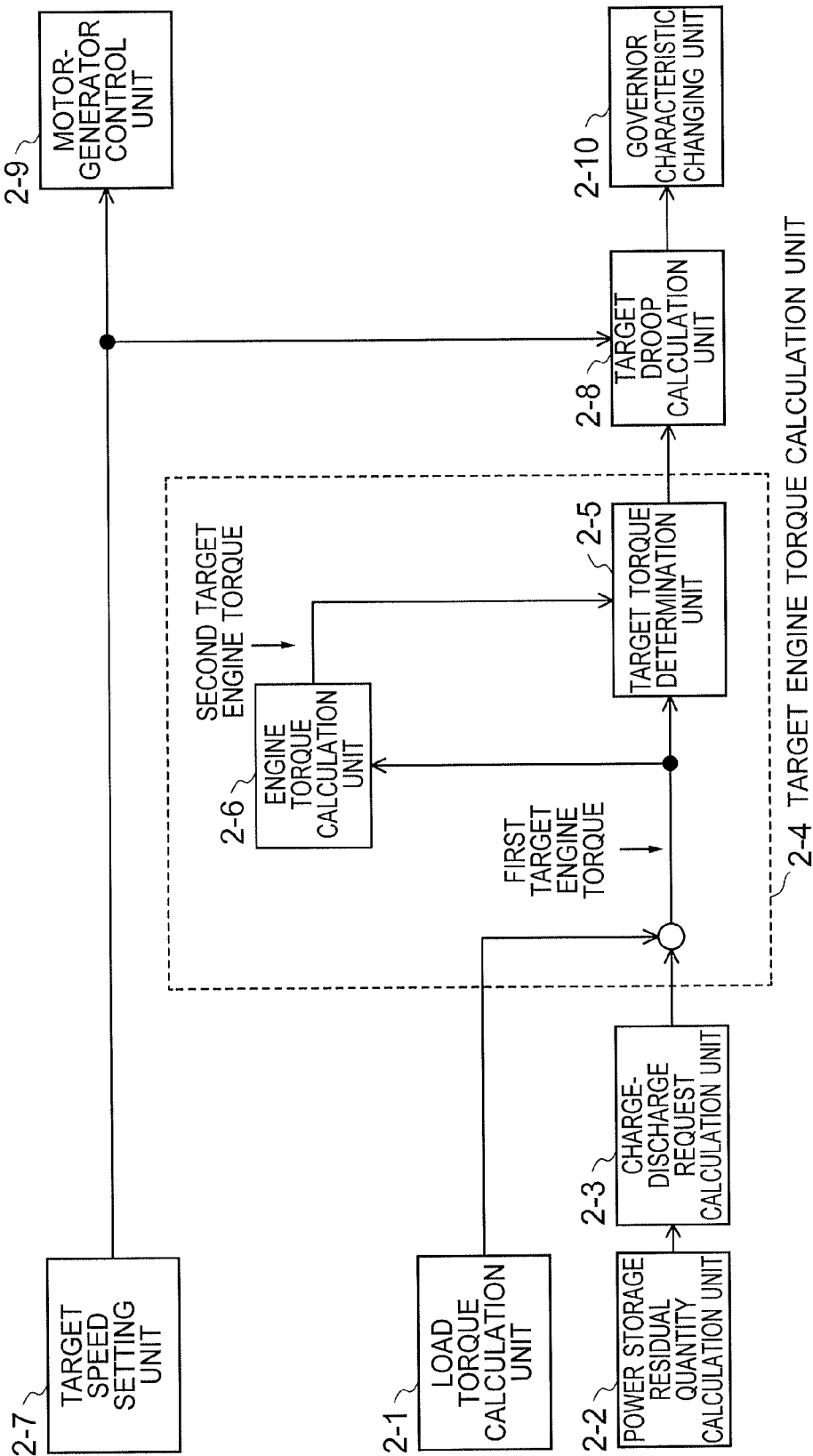
FIG. 3 is a control block diagram of a controller shown in FIG. 2.

Next, the controller 1-8 according to this embodiment will be described. FIG. 3 is a control block diagram of a controller 1-8. It should be noted that, although the engine 1-1, a hydraulic system, various electric components, etc. are also subjected to some control by the controller 1-8, they are not directly related to the present invention and therefore not shown in FIG. 3.

The controller 1-8 includes a load torque calculation unit (load calculation unit) 2-1, a power storage residual quantity calculation unit 2-2, a charge-discharge request calculation unit 2-3, a target engine torque calculation unit (target engine output calculation unit) 2-4, a target droop calculation unit 2-8, a governor characteristic changing unit 2-10, a target speed setting unit 2-7, and the motor-generator control unit 2-9. The power storage residual quantity calculation unit 2-2 outputs a power storage residual quantity calculation result to the charge-discharge request calculation unit 2-3. The target engine torque calculation unit 2-4 receives as input the calculation results obtained by the load torque calculation unit 2-1 and the charge-discharge request calculation unit 2-3 and calculates a target torque of the engine 1-1 to output the calculation result to the target droop calculation unit 2-8.

The target droop calculation unit 2-8 receives as input the calculation result from the target engine torque calculation unit 2-4 and a target speed from the target speed setting unit 2-7 and calculates a characteristic change command (target droop characteristic) of the governor 1-7. The governor characteristic changing unit 2-10 receives as input the calculation result from the target droop calculation unit 2-8 and changes the droop characteristic. Furthermore, the motor-generator control unit 2-9 receives as input the target speed command from the target speed setting unit 2-7 and controls the speed of the motor-generator 1-2.

Figure 4:
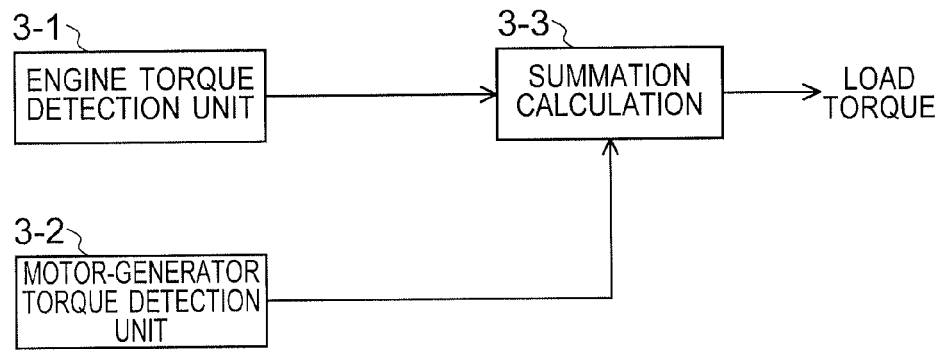
FIG. 4 is a control block diagram of a load torque calculation unit shown in FIG. 3.

Hereinafter, the details of control by each calculation unit will be described. FIG. 4 is a control block diagram of the load torque calculation unit 2-1. As shown in FIG. 4, the load torque calculation unit 2-1 is configured to calculate a load torque from the sum of the torques of the engine 1-1 and the motor-generator 1-2. With this configuration, because the shaft torque of the engine 1-1 is also included in the calculation, the load torque including the loads of auxiliary machines (such as an air conditioner) can be obtained. Furthermore, transfer of energy from an inertial body (such as mainly a flywheel) due to acceleration and deceleration of the engine 1-1 can also be taken into account. In the case of calculating a load torque from a sensor group provided on the hydraulic pump 1-3, these values are difficult to calculate.

An engine torque detection unit 3-1 may directly measure a torque with a torque meter attached to the engine 1-1 or may calculate it indirectly from the fuel injection quantity or the like. In the same manner, a motor-generator torque detection unit 3-2 may measure a torque with a torque meter or alternatively, calculate it indirectly from a current value of the motor-generator 1-2 or the inverter 1-9.

Figure 5:
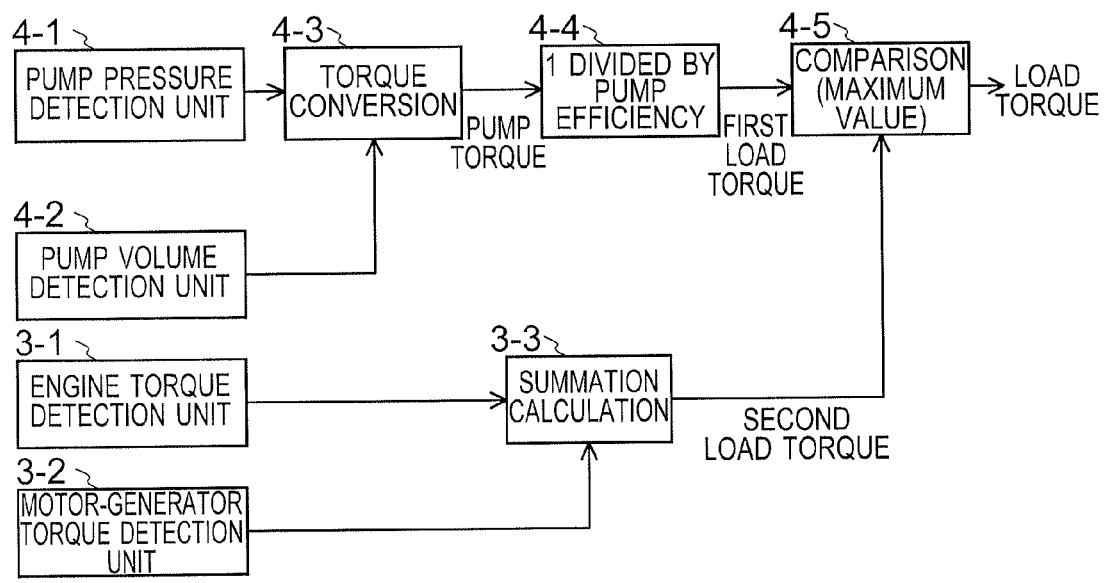
FIG. 5 is a control block diagram showing an alternative configuration of the load torque calculation unit shown in FIG. 4.

Alternatively, the load torque calculation unit 2-1 may adopt a constitution different from FIG. 4. FIG. 5 is a control block diagram showing an alternative constitution of the load torque calculation unit 2-1. The load torque calculation unit 2-1 shown in FIG. 5 calculates a load torque by obtaining an output of the hydraulic pump 1-3 using a pump pressure detection unit 4-1 and a pump volume detection unit 4-2 in addition to the load torque calculation method shown in FIG. 4.

The pump volume detection unit 4-2 may be designed to directly detect a tilt angle of the hydraulic pump 1-3 using the tilt angle sensor 1-21 and convert it to volume, or to calculate a pump volume indirectly by estimating a tilt angle of the hydraulic pump 1-3 from a lever operation quantity or a control command value, such as a pump command pressure. The pump torque discharged by the hydraulic pump 1-3 as calculated by torque conversion 4-3 is divided by a pump efficiency 4-4 to calculate an absorption torque of the hydraulic pump 1-3. Thus, the load torque on the engine shaft can be calculated.

FIG. 5 employs a method in which the larger of a first load torque calculated on the basis of the sensors of the hydraulic pump 1-3 and a second load torque calculated from the sum of the torques of the engine 1-1 and the motor-generator 1-2 is used as a final output. By employing this method, the load is always estimated to be as a larger value, and therefore engine stall or deterioration in operational feeling due to insufficient torque can be avoided.

The power storage residual quantity calculation unit 2-2 calculates a power storage residual quantity of the electric storage device 1-20 using values of the current sensor 1-11, the voltage sensor 1-12, and the temperature sensor 1-13 attached to the capacitor 1-10. The charge-discharge request calculation unit 2-3 calculates a powering/regeneration request to the motor-generator 1-2 to keep the electric power of the capacitor 1-10 within an appropriate range. More specifically, the powering/regeneration request is calculated so that the power storage residual quantity calculated by the power storage residual quantity calculation unit 2-2 follows the calculated target power storage residual quantity inside the charge-discharge request calculation unit 2-3. This can be performed by issuing a powering request if the power storage residual quantity is higher than the target power storage residual quantity, and on the other hand, by issuing a regeneration request if the power storage residual quantity is lower than the target power storage residual quantity.

Furthermore, in hybrid construction machines which include another motor-generator (such as a motor-generator for a swing device) in addition to the motor-generator 1-2 mechanically connected to the engine 1-1, the charge-discharge request calculation unit 2-3 also has the function of calculating a powering/regeneration request to the motor-generator 1-2 mechanically connected to the engine 1-1, in accordance with the powering/regeneration operation of the motor-generator that is not connected to the engine 1-1.

The target engine torque calculation unit 2-4 has the function of calculating a target torque value to be outputted by the engine 1-1. The target engine torque calculation unit 2-4 shown in FIG. 3 calculates a target engine torque in accordance with the outputs of the load torque calculation unit 2-1 and the charge-discharge request calculation unit 2-3. Hereinafter, the contents of calculation in the target engine torque calculation unit 2-4 will be described in order.

Firstly, the target engine torque calculation unit 2-4 calculates a first target engine torque by adding the powering/regeneration request to the motor-generator 1-2 as calculated by the charge-discharge request calculation unit 2-3 to the load on the engine shaft calculated by the load torque calculation unit 2-1. That is, the first target engine torque is obtained by the expression, "target engine torque=load torque−motor-generator torque (where powering is a positive value and regeneration is a negative value)".

For example, if, when the load power calculated by the load torque calculation unit 2-1 is 300 Nm, the power storage residual quantity is high and the powering request to the motor-generator 1-2 calculated by the charge-discharge request calculation unit 2-3 is 100 Nm, the first target engine torque becomes 200 Nm. Furthermore, if, even with the same load torque, the power storage residual quantity is low and the regeneration request to the motor-generator 1-2 calculated by the charge-discharge request calculation unit 2-3 is 100 Nm (in the above expression, −100 Nm), the first target engine power becomes 400 Nm. In this manner, the first target engine torque is determined according to the load torque and the power storage residual quantity.

Next, an engine torque calculation unit 2-6 calculates a second target engine torque. FIG. 3 shows an example in which the first target engine torque is used as the input of the engine torque calculation unit 2-6. Since the second target engine torque is characterized by that the target torque is increased at a predetermined increase rate or less, one method is to use, as the second target engine torque, a signal that is generated by applying a rate limiter to the first target engine torque.

It should be noted that the increase rate (Nm/s) of the above-described rate limiter is not limited to a constant value, and a variable rate limiter for sequentially changing the increase rate is also applicable. Furthermore, as a similar method, a signal generated by applying a low-pass filter to the first target engine torque may be used, or a moving average value of the first target engine torque may be used.

A target torque determination unit 2-5 determines a final output value of the target engine torque calculation unit 2-4 on the basis of the first and second target engine torques calculated by the above-described method. Here, a switching judgment as to which of the first and second target engine torques is selected is based on the fact that the first target engine torque exceeds a predetermined torque.

Figure 6:
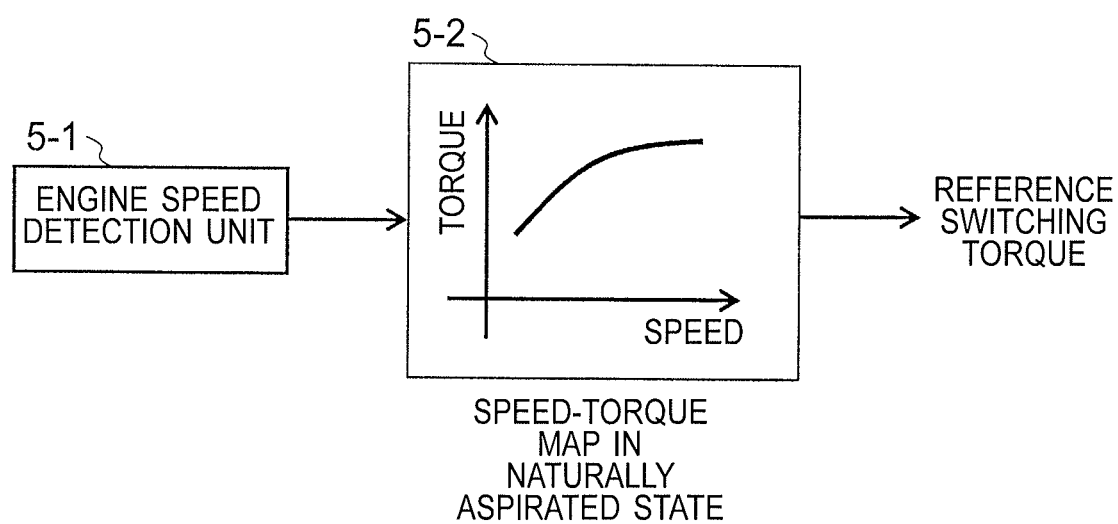
FIG. 6 illustrates an example of the setting of a reference switching torque using a map with an engine torque in a naturally aspirated state measured for each engine speed in a target engine torque calculation unit shown in FIG. 3.

The predetermined torque for use in the switching judgment may be set to a constant value, such as "50% of rated engine torque", or may be changed in accordance with the engine speed, such as "50% of the maximum engine torque for each speed". Furthermore, as shown in FIG. 6, the predetermined torque for switching may be set using a map 5-2 with engine torque in a naturally aspirated state measured for each engine speed.

With this constitution, upon a judgment that the first target engine torque exceeds the engine torque in a naturally aspirated state, that is, supercharging is required, the increase rate of the target torque of the engine 1-1 can be reduced. Thus, the fuel injection quantity can be reduced so as to prevent the engine 1-1 from generating excessive torque on the occurrence of turbo lag, thereby allowing the emission control of exhaust gas having an environmental load. Also, the target torque of the engine can be more appropriately set using the map 5-2 with engine torque measured corresponding to engine speed.

Further, if the above-described predetermined torque is set to "0", the second target engine torque is always selected. When this control is executed, the engine torque is always gradually changed, thereby stabilizing a combustion state and allowing the emission control of exhaust gas having an environmental load. However, the execution of this control causes the engine torque to continue at a low level, leading to an increase in the time for torque assist by the motor-generator 1-2. Therefore, the configuration with the predetermined torque set to "0" is preferably used only when the power storage residual quantity of the capacitor 1-10 is sufficient.

Figure 7A:
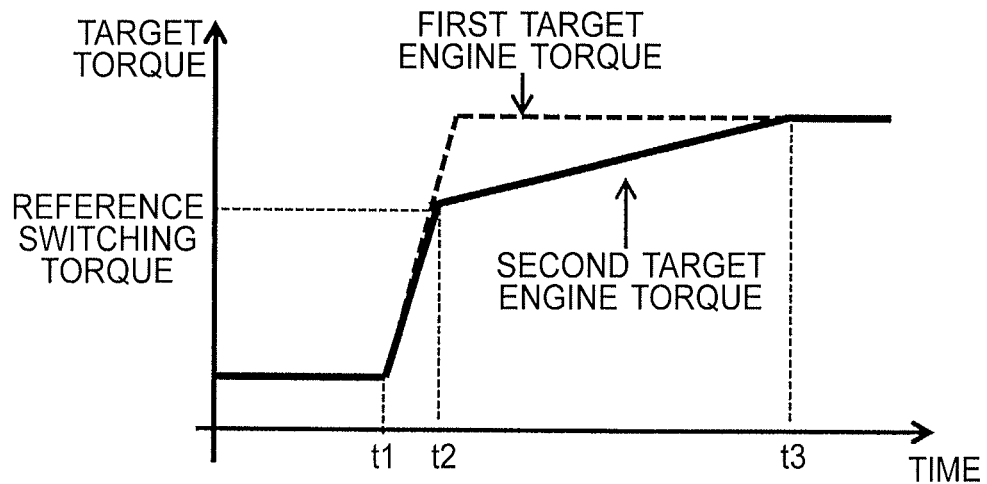
FIGS. 7A and 7B are time series graphs showing the output of a target torque determination unit shown in FIG. 3.
Figure 7B:
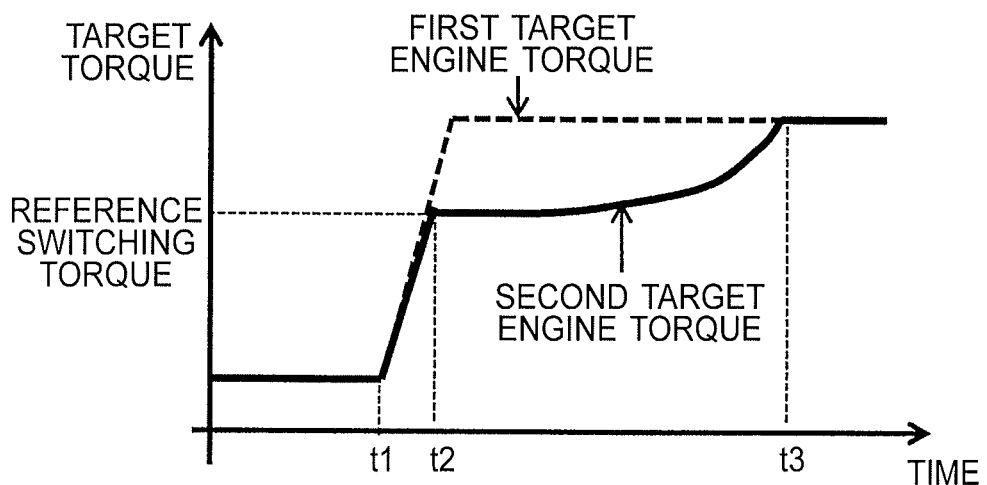

FIGS. 7A and 7B are time series graphs showing examples of output of the target torque determination unit 2-5. It should be noted that FIG. 7A shows an example of the case where the increase rate of the second target engine torque is constant and FIG. 7B shows an example of the case where the increase rate of the second target engine torque is sequentially changed.

As shown in FIG. 7A, at time t1, the first target engine torque rises in response to an increase in load torque. Then, at time t2, the first target engine torque reaches a reference switching torque. After the time t2, the output of the target torque determination unit 2-5 is switched to the second target engine torque with a limited increase rate. Consequently, the output of the target torque determination unit 2-5 forms a waveform in which the increase rate of torque is changed partway as shown by a thick line in FIG. 7A. Since the second target engine torque is produced by limiting the increase rate of the first target engine torque, the respective target torque values coincide with each other after time t3 when the target torque becomes a steady state.

Furthermore, as shown in FIG. 7B, the target torque increase rate of the second target engine torque may be changed sequentially with the passage of time. In this case, a table preliminarily specifying a change in target torque increase rate may be used, or the increase rate may be updated in accordance with the calculation cycle of the controller 1-8, depending on the operating condition (such as power, speed, or boost pressure) of the engine 1-1 as described later.

The target speed setting unit 2-7 is designed to set a target speed of the motor-generator 1-2, and the controller 1-8 outputs a command corresponding to the value set by the target speed setting unit 2-7 to the motor-generator control unit 2-9. The set value of target speed may continue at a constant value corresponding with the scale of an engine control dial or vary depending on each time. When the target speed is changed depending on the time, for example, the speed corresponding to a position best in fuel efficiency on an equal torque line of the target engine torque obtained by the target torque determination unit 2-5 is set as the set value, referring to an equal fuel consumption map of the engine 1-1. Thus, a further improvement in fuel efficiency can be expected.

Next, operation of the target droop calculation unit 2-8 will be described. The target droop calculation unit 2-8 determines a droop characteristic for use in the control of the engine 1-1 on the basis of the target engine torque obtained by the target torque determination unit 2-5 and the target speed command value received from the target speed setting unit 2-7.

Figure 8A:
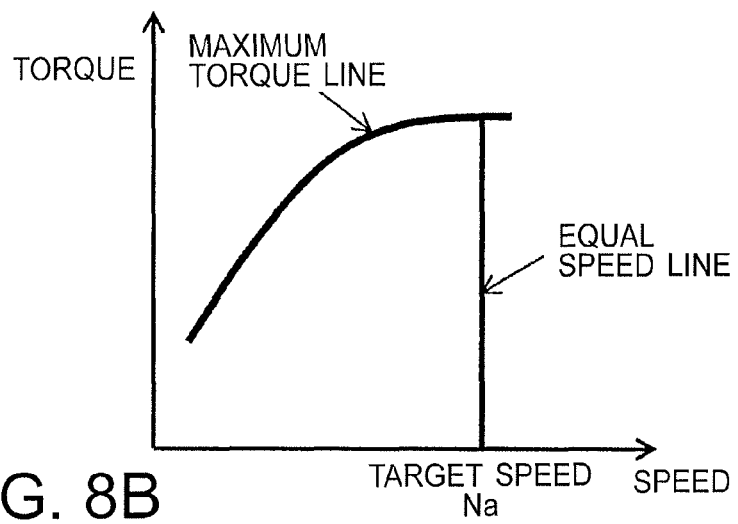
FIGS. 8A to 8C illustrate determination procedures of a droop characteristic according to the first embodiment of the present invention.
Figure 8B:
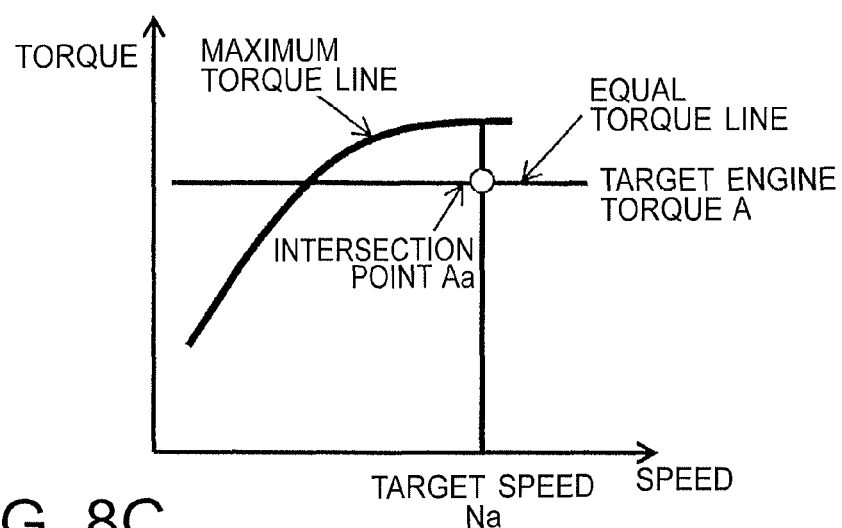
Figure 8C:
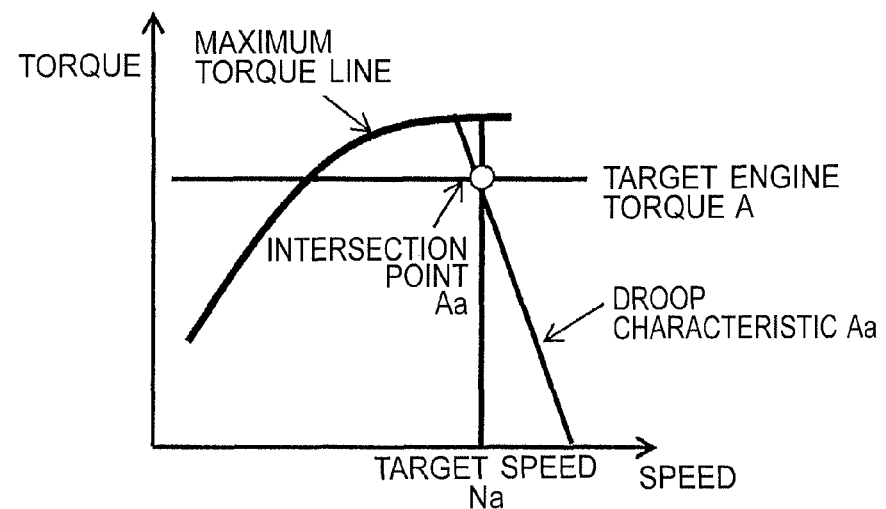

The contents of calculation of the target droop calculation unit 2-8 will be described with reference to FIGS. 8A to 8C by using an example where the target speed Na is given. FIGS. 8A to 8C illustrate determination procedures of a droop characteristic. Firstly, as shown in FIG. 8A, an equal speed line (constant speed line, vertical line) of target speed Na is drawn on a speed-torque characteristic diagram. Next, when target engine torque A is given by the target torque determination unit 2-5, an equal torque line (constant output line, horizontal line) of the target engine torque A is drawn on the speed-torque characteristic diagram. Then, as shown in FIG. 8B, the intersection of the two straight lines is determined by one point of intersection point Aa. Finally, as shown in FIG. 8C, a single droop characteristic Aa passing through the intersection point Aa is determined.

When implementing the above-described processing, a map having two inputs of a target torque and a target speed may referred to, or a droop line passing through the intersection of an equal torque line and an equal speed line may be algebraically calculated. In the algebraic calculation, the straight line, y=ax+b passing through two points of the coordinate of the intersection of the two straight lines and the coordinate of the no-load speed can be calculated.

Figure 9:
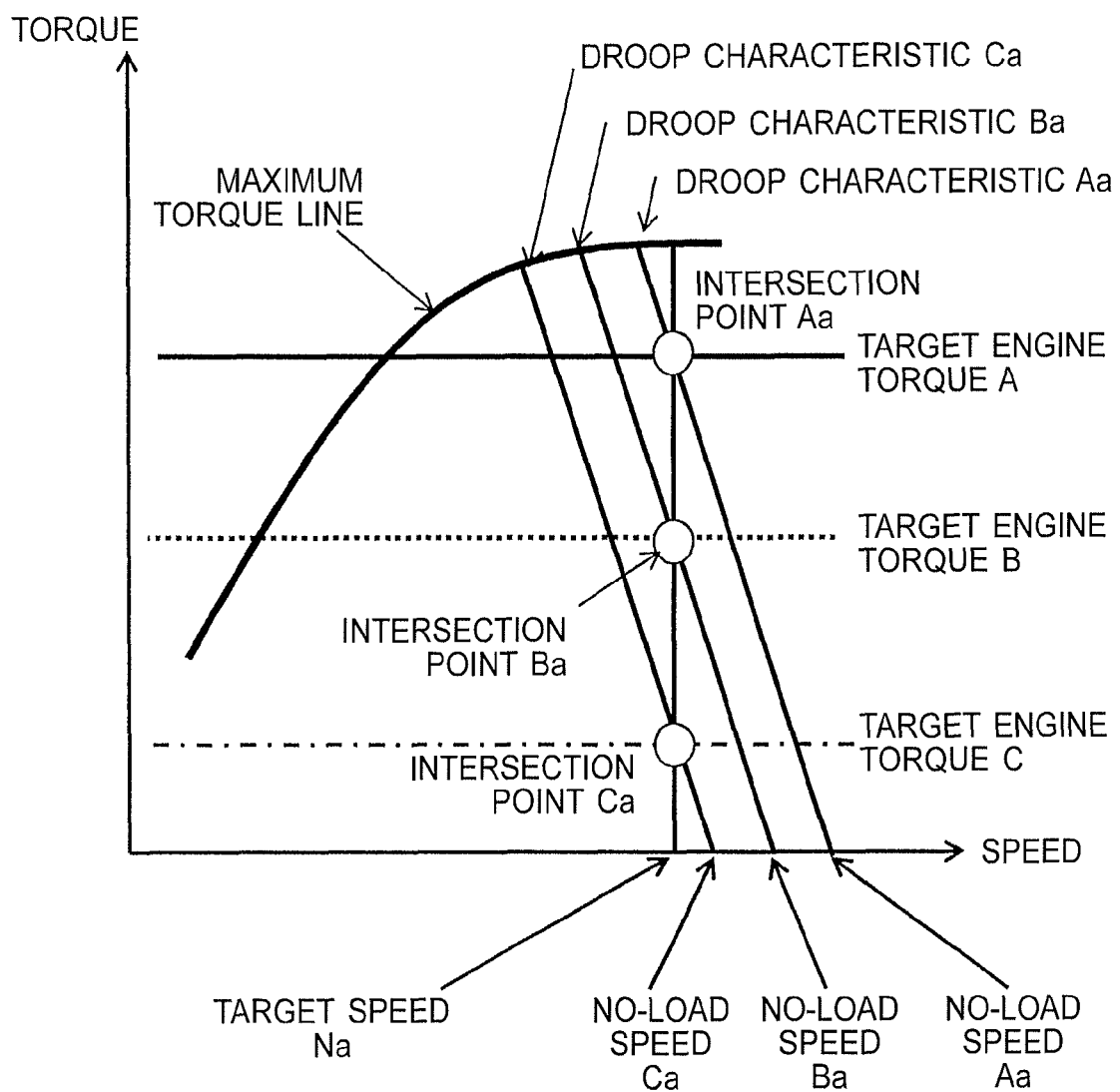
FIG. 9 is a speed-torque characteristic diagram showing a change in droop characteristic when target engine torque is changed.

Next, the contents of calculation of the target droop calculation unit 2-8 in the case where the target engine torque is changed will be described. FIG. 9 is a speed-torque characteristic diagram showing a change in droop characteristic when the target engine torque is changed. By the processing previously described in FIGS. 8A to 8C, when the target speed Na and target engine torques A, B, and C are determined, droop characteristics Aa, Ba, and Ca passing through intersection points Aa, Ba, and Ca of the equal torque lines and equal speed line corresponding to their respective target values are uniquely set.

In this manner, in this embodiment, although the actual speed of the engine 1-1 always lies on the target speed Na, the engine torque is changed in accordance with the target torque, and therefore the engine 1-1 appears to operate with isochronous control.

However, in the engine in which isochronous control is actually performed, the engine torque is changed in accordance with the actual load torque. Therefore, it is difficult to cause the engine 1-1 to operate with an optional target torque independently of the magnitude of the load torque. This makes a large difference between the operation of the engine according to this embodiment and the operation of the engine under the isochronous control.

Figure 10A:
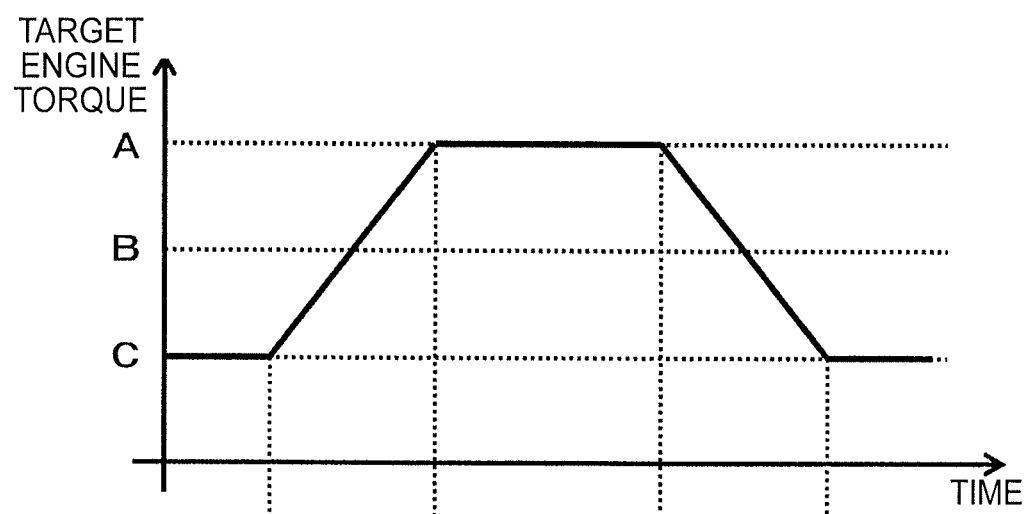
FIGS. 10A and 10B are time series graphs showing the relationship between target engine torques A, B, C and no-load speeds Aa, Ba, and Ca of droop characteristics Aa, Ba, and Ca shown in FIG. 9.
Figure 10B:
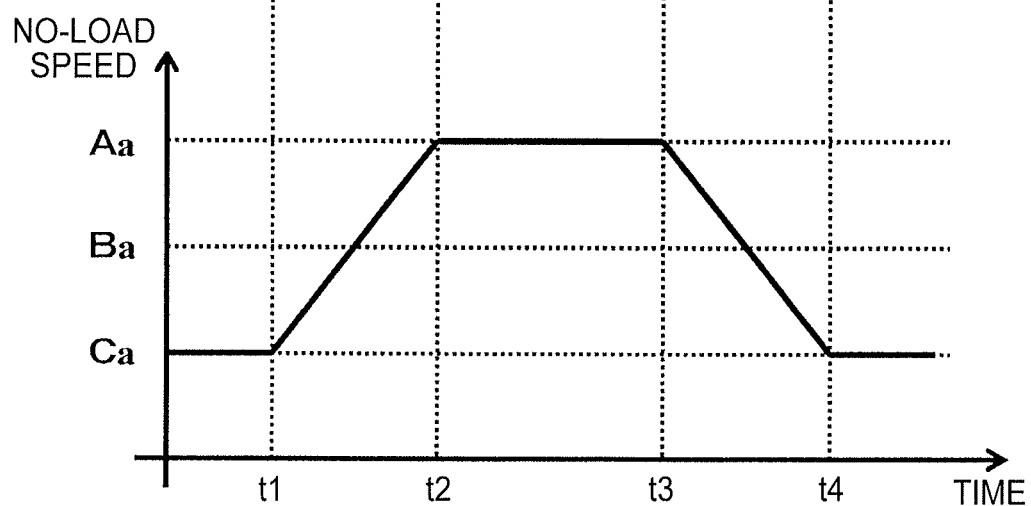
Figure 20A:
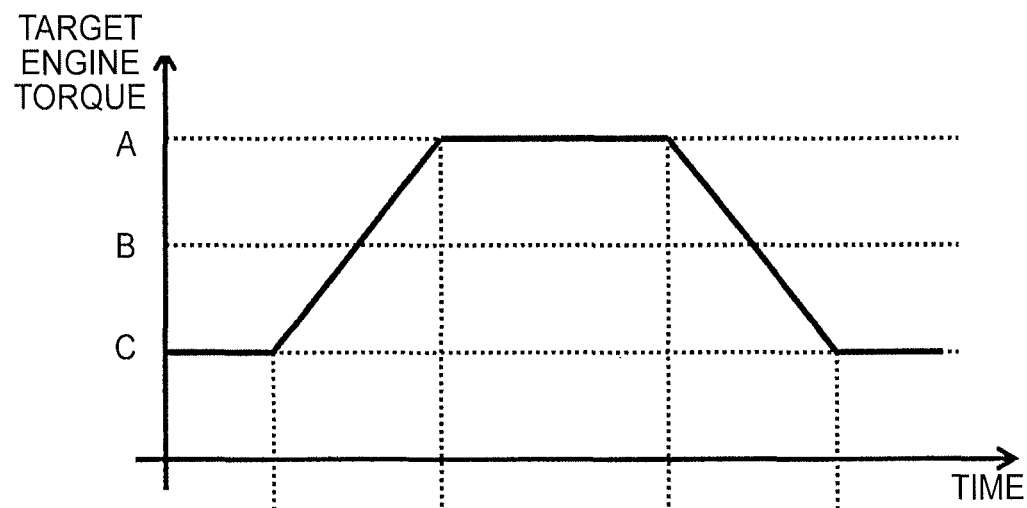
FIGS. 20A and 20B are time series graphs showing the relationship between target engine torques A, B, and C and no-load speed D shown in FIG. 19.
Figure 20B:

FIGS. 10A and 10B are time series graphs showing the relationship between the target engine torques A, B, C and the no-load speeds Aa, Ba, and Ca of the droop characteristics Aa, Ba, and Ca shown in FIG. 9. FIG. 10A shows a pattern in which the target engine torque increases gradually from the target engine torque C at time t1 and reaches the target engine torque A at time t2, and then decreases from time t3. It should be noted that the value of the no-load speed Aa corresponds to no-load speed D in the related art (see FIG. 20B). From FIG. 10B, it can be seen that in this embodiment, the maximum engine speed at no load, between time t1 and t2 and between time t3 to t4, can be reduced as compared with the related art. Thus, in this embodiment, a loss due to drag of the hydraulic pump 1-3, etc. can be prevented. Furthermore, because the engine speed can be reduced, the engine noise can be reduced. Moreover, even if the target engine torque is changed, because the target speed of the motor is controlled at a constant value, the flow rate control of the hydraulic pump 1-3 is also facilitated.

It should be noted that, in order to simplify the figure, the target torques A, B, and C are shown discretely in FIG. 9. However, when the controller is actually mounted, control is preferably performed so that the droop characteristic (no-load speed in FIG. 10B) varies sequentially in accordance with changes in target engine torque as shown in FIGS. 10A and 10B.

Figure 11:
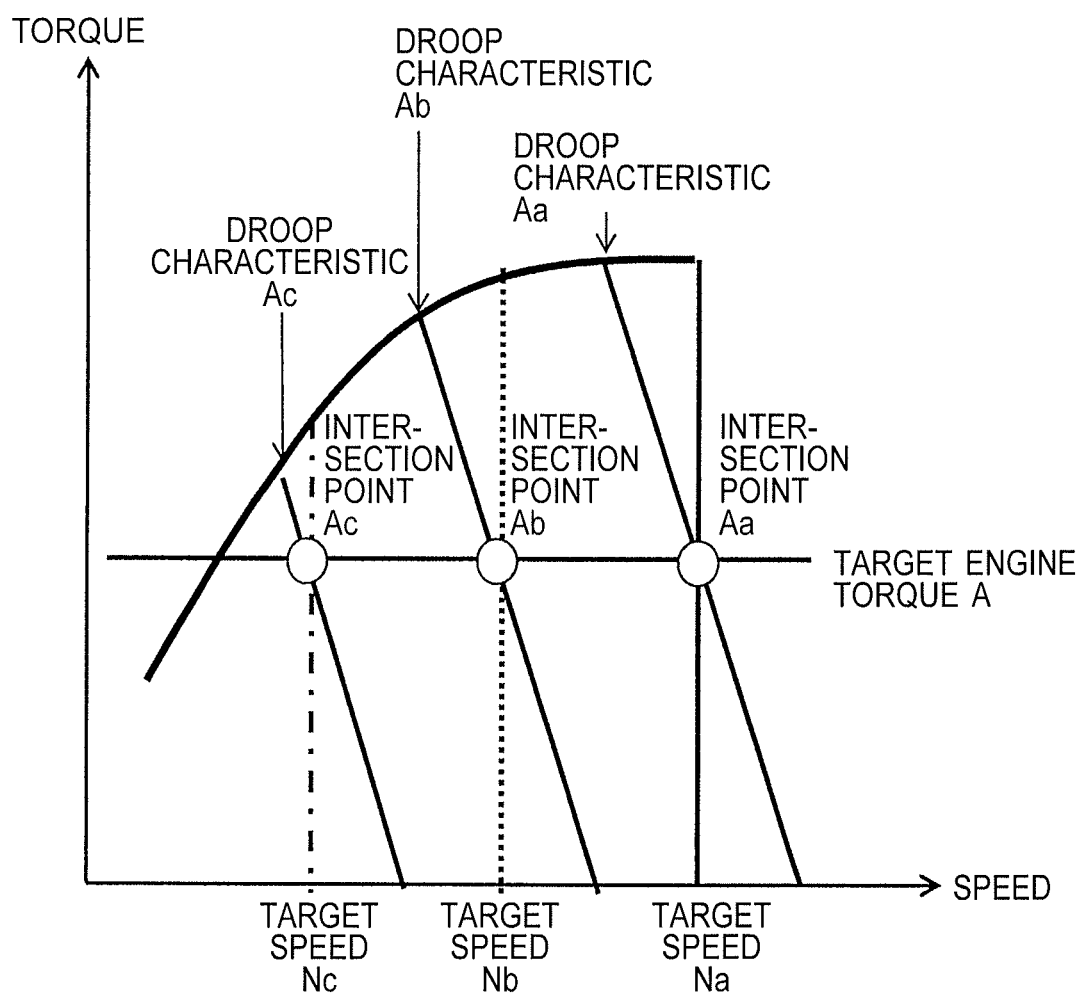
FIG. 11 is a speed-torque characteristic diagram showing changes in droop characteristics when target speeds Na, Nb, and Nc are given to target engine torque A having a constant value.

FIGS. 8A to 8C and 9 show the examples where the target speed command value received from the target speed setting unit 2-7 is the constant value Na. However, since the target speed of the present invention is not limited to a constant value as described above, an example of the control in the case where the target speed is sequentially changed will be described by using FIG. 11. FIG. 11 is a speed-torque characteristic diagram showing a change in droop characteristic when target speeds Na, Nb, and Nc are given to target engine torque A having a constant value.

As shown in FIG. 11, when the target speeds Na, Nb, Nc and the target engine torque A are determined, the target droop calculation unit 2-8 can uniquely set droop characteristics Aa, Ab, and Ac passing through intersection points Aa, Ab, and Ac of the equal torque line and equal speed lines corresponding to their respective target values. It is therefore possible to control the operating point (a pair of speed and torque) of the engine 1-1 at any position on the speed-torque characteristic diagram, by combination of FIG. 9, in which the target speed of the motor-generator 1-2 is constant and the target engine torque of the engine 1-1 is variable, and FIG. 11, in which the target speed of the motor-generator 1-2 is variable and the target engine torque of the engine 1-1 is constant.

Since the operating point of the engine 1-1 greatly influences the fuel efficiency and the emission properties of exhaust gas having an environmental load, the fuel efficiency can be further improved and the emission control of exhaust gas can be achieved by controlling the operating point of the engine 1-1 as in this embodiment.

Second Embodiment

Next, a hybrid excavator according to a second embodiment of the present invention will be described by using FIG. 12. It should be noted that the second embodiment is the same in constitution as the first embodiment except for a difference in a portion of the internal configuration of the controller 1-8. Therefore, hereinafter, as for the same constitution as the first embodiment, description will not be repeated.

FIG. 12 is a control block diagram of a controller of the hybrid excavator according to the second embodiment of the present invention. As shown in FIG. 12, in the second embodiment, the constitution of a boost pressure detection unit 11-1 is added. The boost pressure detection unit 11-1 has the function of outputting measurement data of the boost pressure from the boost pressure sensor 1-19 (see FIG. 2) to the engine torque calculation unit 2-6. The engine torque calculation unit 2-6 calculates a second target engine torque in accordance with the output of the boost pressure detection unit 11-1. A summary of this calculation contents is shown in FIG. 13.

Figure 13A:
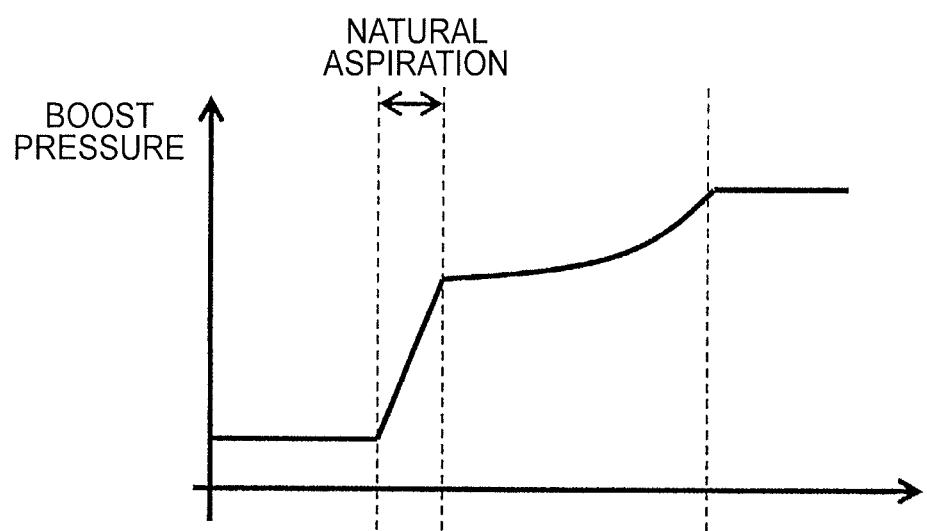
FIGS. 13A and 13B illustrate the contents of calculation of a second target engine torque by a target torque calculation unit shown in FIG. 12.

FIG. 13A shows how boost pressure rises. Firstly, the boost pressure rises rapidly from time t1 up to time t2 when it coincides with the intake pressure of the natural aspiration. The turbo supercharger 1-18 starts operating from the time t2 and the boost pressure increases gradually until time t3. The delay in boost pressure rising response between the time t2 and the time t3 is turbo lag. After the time t3, the boost pressure is fixed in a steady state.

Figure 13B:
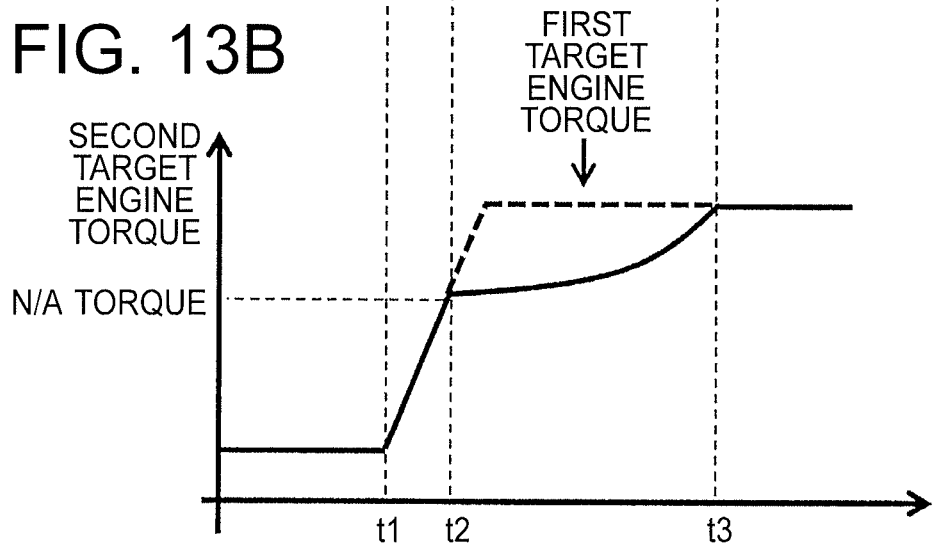

On the basis of the above boost pressure response, the engine torque calculation unit 2-6 calculates a second target engine torque along the boost pressure response waveform shown in FIG. 13B. The second target engine torque shown in FIG. 13B may be calculated by applying a rate limiter for sequentially changing the increase rate in accordance with boost pressure to the first target engine torque, or by referring to a table recording the correspondence relationship between the boost pressure and the target engine torque.

If the second target engine torque is calculated in this manner, and then the reference torque for switching between the first target engine torque and the second target engine torque in the target torque determination unit 2-5 is set to the engine torque (N/A torque in FIG. 13B) in a naturally aspirated state, the target engine torque value is prevented from exceeding the torque which can be output by the engine 1-1 during the occurrence of turbo lag. By performing this control, excessive fuel injection of the engine 1-1 can be prevented, and therefore further energy saving can be achieved.

It should be noted that, when excessive fuel injection during the occurrence of turbo lag causes incomplete combustion due to the shortage of air volume, resulting in the generation of black smoke. However, because in the second embodiment, the target engine torque during the occurrence of turbo lag is set to the second engine target torque corresponding to the boost pressure, excessive fuel injection can be prevented, and the generation of black smoke can be also prevented. Furthermore, this reference torque may be changed depending on the operating speed of the engine 1-1. In this case, excessive fuel injection and the generation of black smoke are further prevented.

Figure 14:
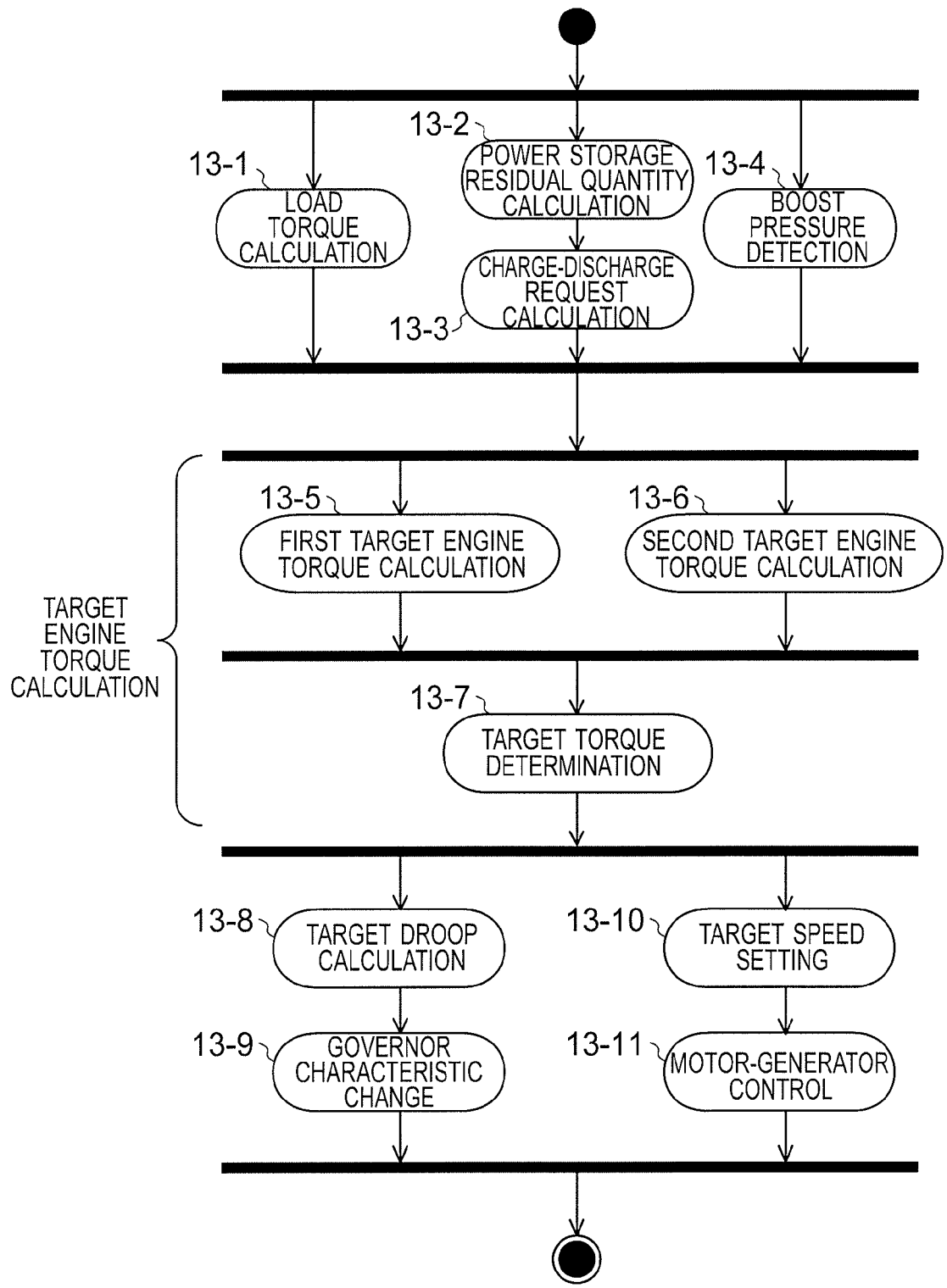
FIG. 14 is an activity diagram showing calculation procedures of the controller used in the second embodiment of the present invention.

Next, the details of calculation procedures of the controller 1-8 according to the second embodiment will be described by using FIG. 14. FIG. 14 is an activity diagram showing calculation procedures of the controller 1-8. As shown in FIG. 14, the controller 1-8 performs each processing of load torque calculation 13-1, power storage residual quantity calculation 13-2, charge-discharge request calculation 13-3, and boost pressure detection 13-4. Here, the calculation contents of the load torque calculation unit 2-1 correspond to the load torque calculation 13-1; the calculation contents of the power storage residual quantity calculation unit 2-2 and the charge-discharge request calculation unit 2-3 correspond to the power storage residual quantity calculation 13-2 and the charge-discharge request calculation 13-3, respectively; and the detection of sensor data from the boost pressure sensor 1-19 by the boost pressure detection unit 11-1 corresponds to the boost pressure detection 13-4.

On the basis of the above calculation results, the controller 1-8 calculates a target torque of the engine 1-1 using the target engine torque calculation unit 2-4. This corresponds to the target engine torque calculation in FIG. 14. In this calculation, after first target engine torque calculation 13-5 and second target engine torque calculation 13-6 are performed in parallel, a final target engine torque is determined in target torque determination 13-7.

Subsequently, a droop characteristic command to the engine 1-1 is calculated in target droop calculation 13-8 on the basis of the above-described calculation results. The above-described target droop calculation unit 2-8 is used for this calculation. Then the control contents of the engine 1-1 are changed in governor characteristic change 13-9 according to the calculation results of the target droop calculation 13-8.

Moreover, as processing concerning the motor-generator 1-2, processing of outputting the target speed command set by the target speed setting unit 2-7 to the motor-generator control unit 2-9 is performed. This processing corresponds to target speed setting 13-10 and motor-generator control 13-11 in FIG. 14. The above calculation is carried out every calculation cycle (for example, every 10 milliseconds) of the controller 1-8.

It is obvious that, if in FIG. 14, the boost pressure detection 13-4 is deleted, this figure becomes an activity diagram showing the calculation procedures of the controller 1-8 according to the first embodiment.

Up to this point the embodiments with "target torque" used as the target output of the engine 1-1 have been described, but the present invention may be implemented with "target power (the product of torque and speed)" used in place of the target torque. In this case, because the unit of electric power is determined by W (Watt), there is an advantage that control of the charge-discharge quantity to the electric storage device is easier when control is performed using power (W) than when the controlled variable is determined using torque (Nm).

Figure 15:
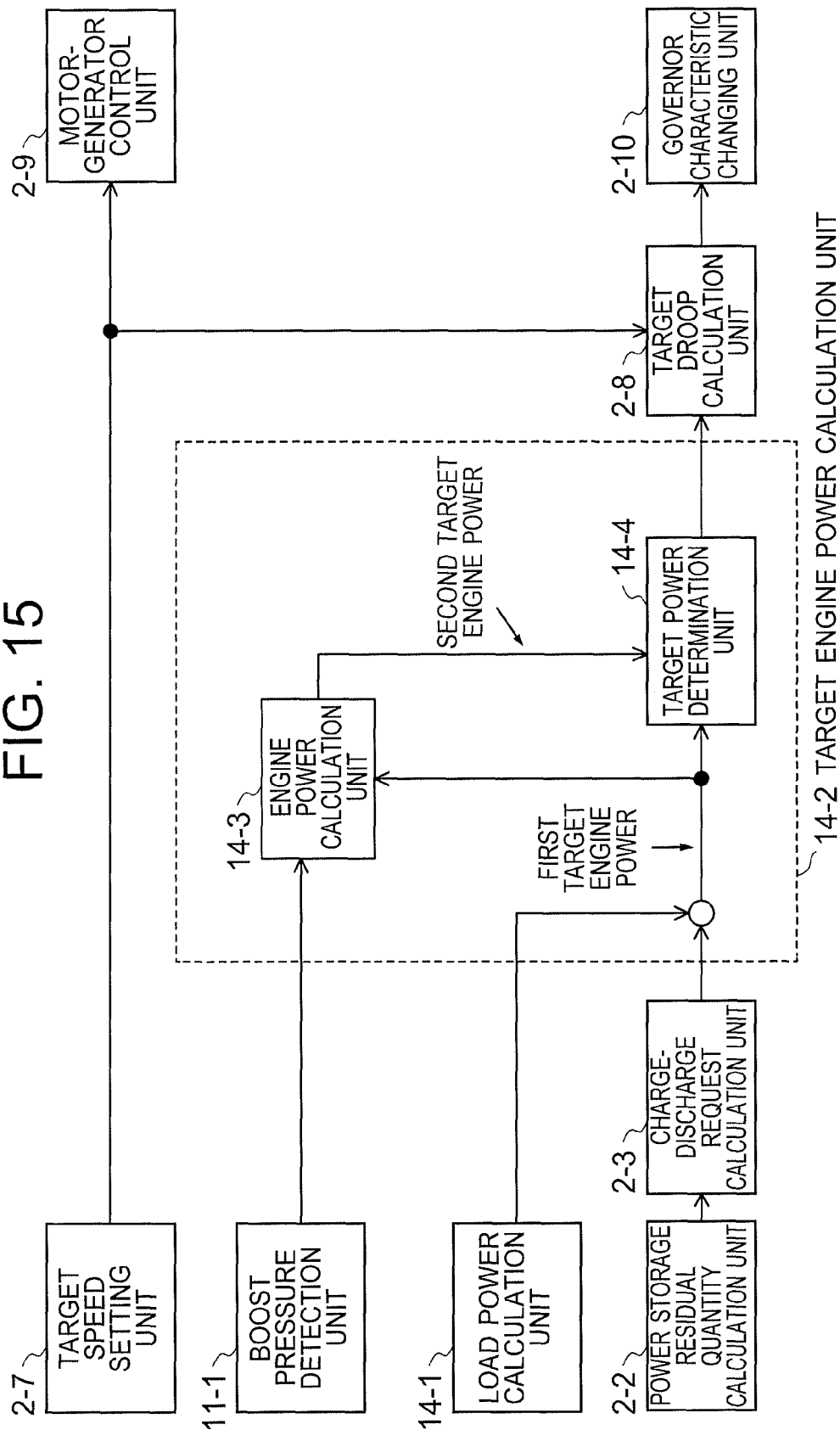
FIG. 15 is a control block diagram of the controller according to the second embodiment of the present invention in the case of performing control using power.

FIG. 15 shows an example of the controller 1-8 in the case of performing control using power. FIG. 15 shows the case where torque is converted into power in the configuration of FIG. 12 in which control is performed using torque. This conversion can be easily performed in relation to "power=torque×speed". Furthermore, after a target engine power is determined by a target power determination unit 14-4, the contents of calculation of the target droop calculation unit 2-8 are changed from FIG. 8 to FIG. 16.

Figure 16A:
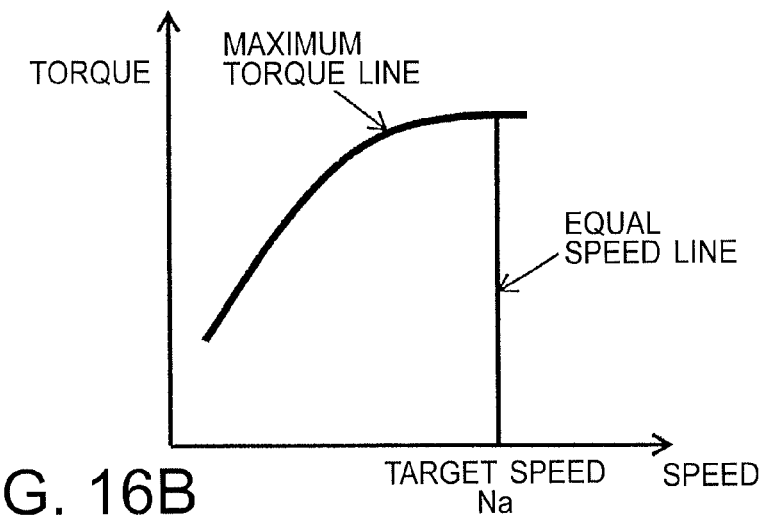
FIGS. 16A to 16C illustrate determination procedures of a droop characteristic when a target engine power is given in the second embodiment of the present invention.
Figure 16B:
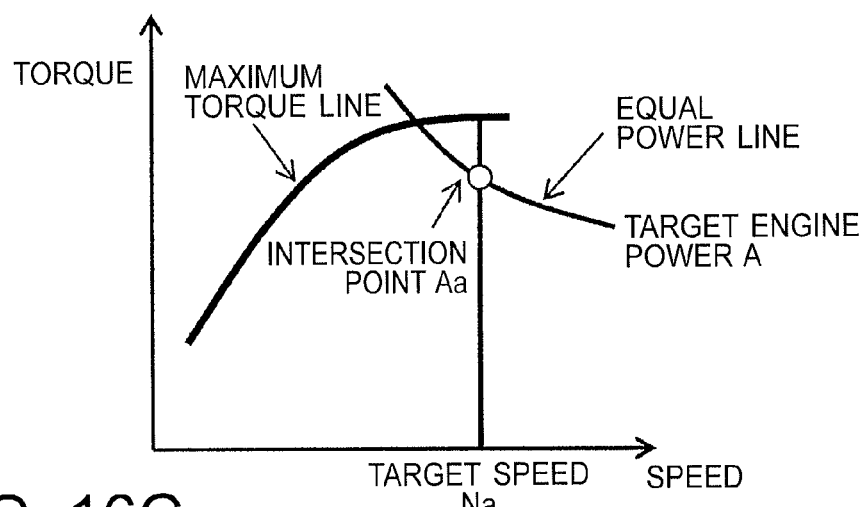
Figure 16C:
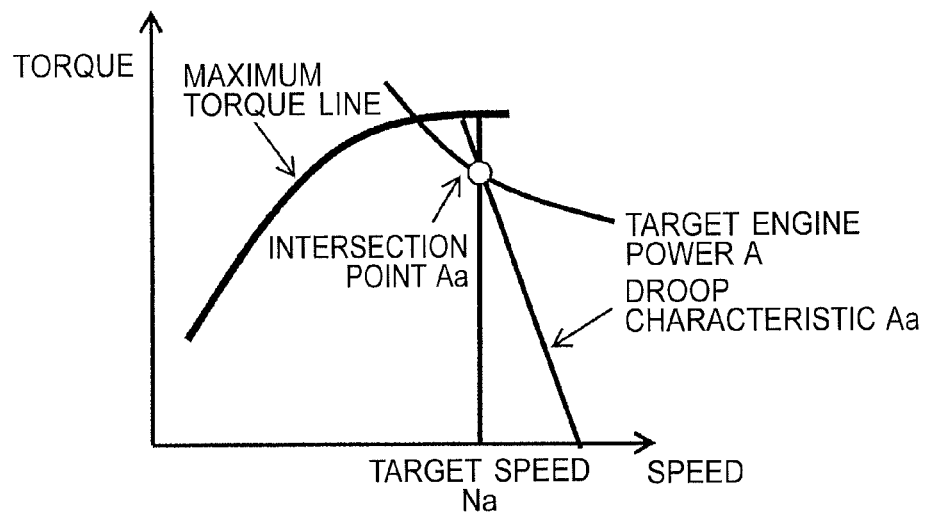

The contents of calculation when target speed Na is given will be described with reference to FIGS. 16A to 16C. Firstly, as shown in FIG. 16A, an equal speed line (vertical line) of the target speed Na is drawn on a speed-torque characteristic diagram. Next, when target engine power A is determined by the target power determination unit 14-4, an equal power line (curve line) of the target engine power A is drawn on the speed-torque characteristic diagram. Then, as shown in FIG. 16B, the intersection of the two straight lines is determined by one point of intersection point Aa. Finally, as shown in FIG. 16C, a single droop characteristic Aa passing through the intersection point Aa is determined. Thereafter, the same calculation as that in the case of using the unit of torque is performed.

As described above, according to the above-described embodiments, when the target speed of the motor-generator 1-2 and the target torque of the engine 1-1 are given, the droop characteristic passing through the intersection of the equal torque line (constant output line) with the target torque value of the engine 1-1 and the equal speed line (constant speed line) with the target speed command of the motor-generator 1-2 is determined on the speed-torque characteristic diagram. Then the engine 1-1 can be controlled by the droop characteristic based on the determination, thereby allowing the maximum engine speed at no load to correspond to the target torque value of the engine 1-1. That is, it is possible to prevent a situation where despite the small target torque of the engine 1-1, the maximum engine speed at no load is high.

Figure 19:
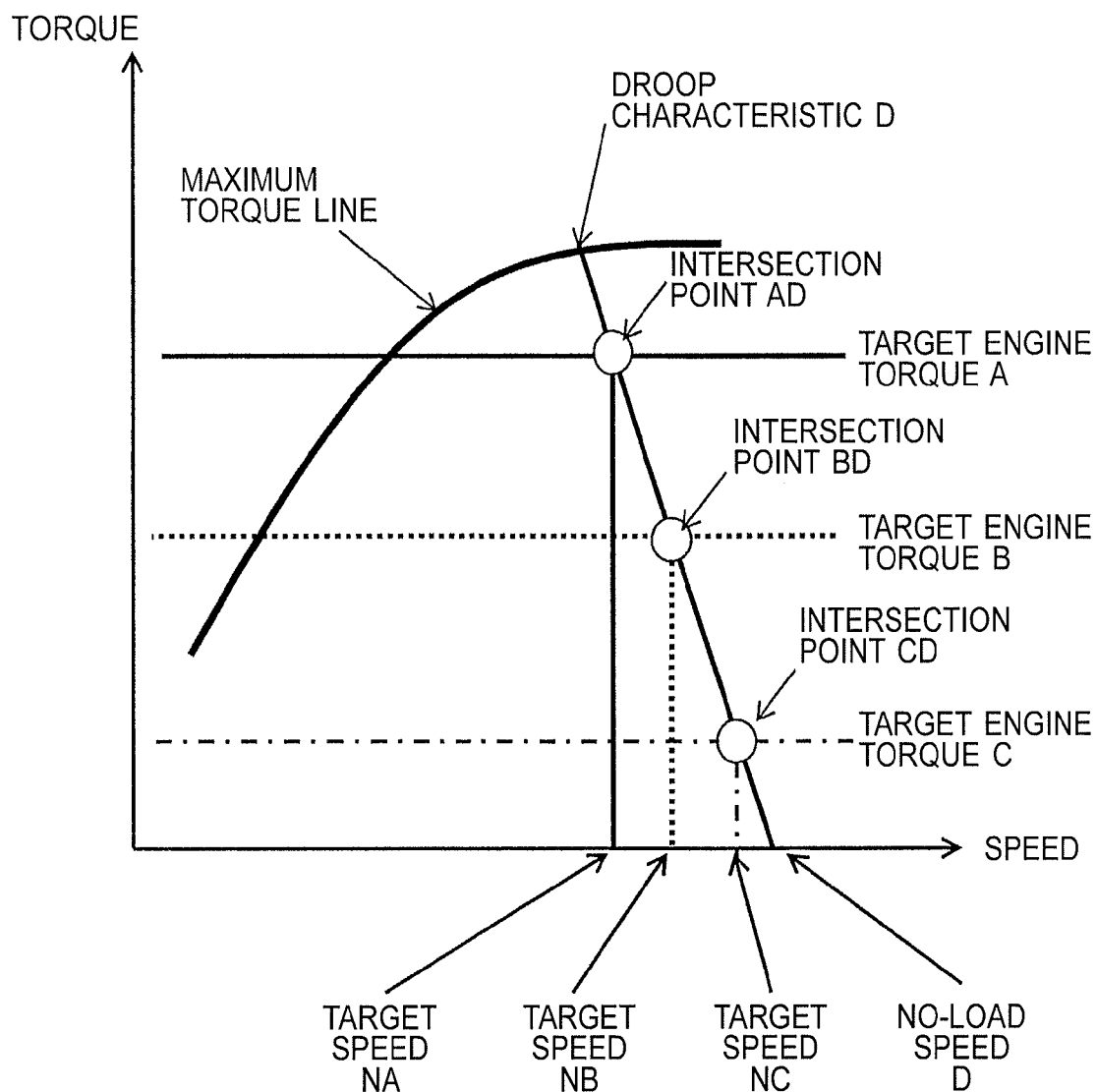
FIG. 19 is a speed-torque characteristic diagram showing changes in target speed when the target engine torque is changed in the related art.

More specifically, when the droop characteristic is fixed as in the related art, the maximum engine speed at no load takes a predetermined value (see FIG. 19). On the other hand, according to the above-described embodiments, as the target torque (output) of the engine 1-1 decreases, the droop characteristic is changed accordingly. Thus, the maximum engine speed at no load can be reduced, as compared with the case where the target torque of the engine 1-1 is large (see FIG. 9).

Thus, a loss due to drag of the hydraulic pump 1-3, etc. can be prevented. Further, according to these embodiments, as described above, various advantageous effects, such as low engine noise, energy saving, low fuel consumption, and the emission control of exhaust gas, are exerted.

According to these embodiments, again, the motor-generator 1-2 rotates in accordance with the target speed command value, and the droop characteristic is changed depending on the target output of the engine 1-1, so that the engine 1-1 can be kept at an optional target operating point (such as target speed or target output). This means that the engine 1-1 is allowed to operate in a proper operation state close to a steady state. Therefore, according to these embodiments, because the combustion is stabilized in a steady state of the engine 1-1, energy saving and the emission control of exhaust gas having an environmental load can be achieved. Further, because the motor-generator 1-2 is controlled so as to rotate in accordance with the target speed command value even when the target output of the engine 1-1 changes, the flow control of the hydraulic pump 1-3 is also facilitated.

Furthermore, in these embodiments, the engine 1-1 can be kept at an optional target operating point, and therefore the energy-saving effect can be further enhanced by fixing the operating point of the engine 1-1 to the maximum fuel consumption point in an equal fuel consumption map. In the same manner, by allowing the engine 1-1 to operate at the operating point permitting the emission control of exhaust gas having an environmental load, the emission of exhaust gas having an environmental load can be effectively controlled.

Moreover, according to the above-described embodiments, when the first target engine output exceeds a predetermined switching reference, the target output of the engine 1-1 can be changed from the first target engine output to the second target engine output that is obtained by limiting the first target engine output in increase rate of the target output, thereby allowing prevention of an abrupt increase in engine output. This allows a reduction in the fuel consumed to abruptly increase the engine output. Furthermore, the reduction in the increase rate of the engine output allows the engine 1-1 to operate in a proper operation state close to a steady state. It is therefore possible to contribute to further energy saving and the emission control of exhaust gas having an environmental load. Also, the reduction in the frequency of using the engine 1-1 under a heavy load leads to prevention overheat of the engine 1-1.

Furthermore, according to the above-described embodiments, the target output of the engine 1-1 can be calculated on the basis of the load on the engine shaft and the charge-discharge request for the electric storage device 1-20, so that the target engine output can be prevented from being continuously set lower relative to the load. Consequently, the frequency of powering by the motor-generator 1-2 is reduced, thereby allowing a reduction in the power consumption of the electric storage device 1-20. This leads to the avoidance of a situation where power assist becomes impossible due to the shortage of power storage residual quantity and engine stalling occurs. Moreover, the above-described embodiments can prevent the target engine output from being continuously set higher relative to the load, thereby allowing a reduction in the frequency of regeneration by the motor-generator 1-2 and also allowing the prevention of overcharge to the electric storage device 1-20.

Also, according to the above-described embodiments, the target engine output corresponding to the condition of the engine 1-1 can be produced at each time. It is therefore possible to contribute to further energy saving and the emission control of exhaust gas having an environmental load.

Also, according to the above-described embodiments, the target engine output is quickly raised in a natural aspiration zone where the engine output rises quickly. This allows a reduction in the assist quantity of the motor-generator 1-2, so that power consumption of the electric storage device 1-20 can be reduced.

Also, according to the above-described embodiments, the predetermined output of the target engine torque calculation unit 2-4 is changed depending on the operating speed of the engine 1-1. Thus, the target engine output can be designed in consideration of the maximum output line of the engine 1-1 and the maximum output line of the motor-generator 1-2.

It should be noted that while the foregoing embodiments are preferred embodiments of the present invention, the present invention is not limited to those embodiments. Various changes in form may be made without departing from the gist of the invention. For example, the hybrid construction machine according to the embodiments of the invention is also applicable to construction machines, such as wheel loaders, other than hydraulic excavators.

What is claimed is:

1. A hybrid construction machine comprising:
    an engine;
    a hydraulic pump that is driven by the engine;
    a hydraulic working portion that is driven by pressure oil discharged from the hydraulic pump;
    a motor-generator that performs power transfer between the engine and the motor-generator;
    an electric storage device that supplies electric power to the motor-generator; and
    a controller that controls the engine with a governor characteristic having a predetermined inclination, the inclination representing a relationship between load and speed such that engine speed decreases with increasing load,
    the controller including:
        a target engine output calculation unit that calculates a target output of the engine;
        a target speed setting unit that sets a target speed command of the motor-generator;
        a target droop calculation unit that obtains an intersection point of a constant output line with the target output value of the engine as calculated by the target engine output calculation unit and a constant speed line with the target speed command of the motor-generator on a speed-torque characteristic diagram, and determines a governor characteristic of the engine so that the governor characteristic passes through the intersection point on the speed-torque characteristic diagram;
        a governor characteristic changing unit that changes the governor characteristic of the engine in accordance with the governor characteristic obtained by the target droop calculation unit; and
        a motor-generator control unit that controls the motor-generator in accordance with the target speed command value set by the target speed setting unit.

2. The hybrid construction machine according to claim 1, wherein the target engine output calculation unit calculates a first target engine output, and when the first target engine output is a predetermined switching reference or less, the target engine output calculation unit outputs the first target engine output as the target output of the engine, while, when the first target engine output exceeds the predetermined switching reference, the target engine output calculation unit calculates a second target engine output and outputs the second target engine output as the target output of the engine, the second target engine output being obtained by limiting the first target engine output in increase rate of the target output.

3. The hybrid construction machine according to claim 1, wherein the controller further includes:
    a load calculation unit that calculates a load on a shaft of the engine;
    a power storage residual quantity calculation unit that calculates a residual quantity of the electric storage device; and
    a charge-discharge request calculation unit that calculates a charge-discharge request required to keep electric power of the electric storage device within a proper range on the basis of an output of the power storage residual quantity calculation unit,
    wherein the target engine output calculation unit calculates a target output of the engine on the basis of calculation results calculated by the charge-discharge request calculation unit and the load calculation unit.

4. The hybrid construction machine according to claim 2, wherein the target engine output calculation unit sequentially changes the increase rate of the target output at the time of calculating the second target engine output, depending on an operation condition of the engine.

5. The hybrid construction machine according to claim 2, wherein
    the engine includes a turbo supercharger and a boost pressure sensor that measures boost pressure of the engine; and
    the target engine output calculation unit increases or decreases the increase rate of the target output at the time of calculating the second target engine output, depending on an increase or decrease of an output value from the boost pressure sensor.

6. The hybrid construction machine according to claim 2, wherein
    the engine includes a turbo supercharger; and
    an engine output value that can be output in a naturally aspirated state is set as the predetermined switching reference.

7. The hybrid construction machine according to claim 2, wherein the predetermined switching reference is changed depending on operating speed of the engine.

8. The hybrid construction machine according to claim 2, wherein the controller further includes:
    a load calculation unit that calculates a load on a shaft of the engine;
    a power storage residual quantity calculation unit that calculates a residual quantity of the electric storage device; and
    a charge-discharge request calculation unit that calculates a charge-discharge request required to keep electric power of the electric storage device within a proper range on the basis of an output of the power storage residual quantity calculation unit,
    wherein the target engine output calculation unit calculates a target output of the engine on the basis of calculation results calculated by the charge-discharge request calculation unit and the load calculation unit.

* * * * *